United States Patent
Kabasawa

(10) Patent No.: US 8,535,850 B2
(45) Date of Patent: Sep. 17, 2013

(54) FUEL CONTAINER FOR FUEL CELL

(75) Inventor: Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 2230 days.

(21) Appl. No.: 11/226,048

(22) Filed: Sep. 13, 2005

(65) Prior Publication Data

US 2006/0008686 A1    Jan. 12, 2006

Related U.S. Application Data

(63) Continuation of application No. PCT/JP2004/003784, filed on Mar. 19, 2004.

(30) Foreign Application Priority Data

Mar. 19, 2003 (JP) .................................. 2003-74891
Mar. 19, 2003 (JP) .................................. 2003-74900

(51) Int. Cl.
*H01M 8/06*      (2006.01)

(52) U.S. Cl.
USPC .......................................... 429/515; 429/408

(58) Field of Classification Search
None
See application file for complete search history.

(56) References Cited

U.S. PATENT DOCUMENTS

| | | | | |
|---|---|---|---|---|
| 3,014,976 | A | * | 12/1961 | Blackmer ........................ 429/25 |
| 3,507,635 | A | | 4/1970 | Sarem et al. |
| 4,155,712 | A | | 5/1979 | Taschek |
| 5,723,229 | A | | 3/1998 | Scheifers et al. |
| 6,544,400 | B2 | * | 4/2003 | Hockaday et al. ............ 205/338 |
| 6,802,875 | B1 | | 10/2004 | Kimbara et al. |
| 2001/0028965 | A1 | | 10/2001 | Boneberg et al. |
| 2001/0045364 | A1 | | 11/2001 | Hockaday et al. |
| 2002/0025462 | A1 | | 2/2002 | Nakanishi et al. |
| 2003/0009942 | A1 | | 1/2003 | Amendola et al. |
| 2003/0014917 | A1 | | 1/2003 | Rusta-Sallehy et al. |
| 2003/0138679 | A1 | | 7/2003 | Prased et al. |

FOREIGN PATENT DOCUMENTS

| | | |
|---|---|---|
| EP | 1 081 780 A2 | 3/2001 |
| EP | 1 111 702 A2 | 6/2001 |
| EP | 1 170 249 A1 | 1/2002 |
| EP | 1 329 972 A2 | 7/2003 |
| GB | 1 230 616 A | 5/1971 |
| JP | 59-066066 A | 4/1984 |
| JP | 2001-068127 A | 3/2001 |
| JP | 2001-093551 A | 4/2001 |
| JP | 2002-280035 A | 9/2002 |
| JP | 2002-373693 A | 12/2002 |

(Continued)

OTHER PUBLICATIONS

Japanese Office Action dated Sep. 8, 2009 (4 pages), and English translation thereof (4 pages), issued in counterpart Japanese Application Serial No. 2003-074900.

*Primary Examiner* — John S Maples

(74) *Attorney, Agent, or Firm* — Holtz, Holtz, Goodman & Chick, PC

(57) ABSTRACT

A fuel container according to the present invention includes a container body (15), a fuel (10) provided in the container body (15), a draining port (9) provided to the container body (15) for supplying the fuel (10) to the outside of the container body (15), a fluid introduction unit (19) which introduces into the container body (15) a fluid corresponding to flow-out of the fuel (10) from the draining port (9), and a swelling member (17) which connects to the fluid introduction unit (19) and swells in the container body (15) by absorbing the fluid.

12 Claims, 11 Drawing Sheets

(56) References Cited

FOREIGN PATENT DOCUMENTS

| | | |
|---|---|---|
| JP | 2003-36879 A | 2/2003 |
| JP | 2003-51333 A | 2/2003 |
| WO | WO 01/74710 | 10/2001 |
| WO | WO 01/74710 A1 | 10/2001 |
| WO | WO 03/006150 A1 | 1/2003 |
| WO | WO 03/006366 A1 | 1/2003 |

* cited by examiner

FUEL CONTAINER FOR FUEL CELL

This application is a U.S. Continuation Application under 35 USC 371(c) of International Application PCT/2004/003784 filed Mar. 19, 2004.

TECHNICAL FIELD

The present invention relates to a fuel container for storing a liquid fuel, and particularly relates to a fuel container for fuel cell for storing a liquid fuel to be supplied to a fuel cell.

BACKGROUND ART

Recently, compact electronic apparatuses such as cellular phones, lap-top personal computers, digital cameras, PDAs (Personal Digital Assistance), electronic pocket diaries, etc. have remarkably progressed and developed. As the power source for a compact electronic apparatus, a primary cell such as an alkaline dry cell, a manganese dry cell, etc. and a secondary cell such as a nickel-cadmium storage cell, a nickel-hydrogen storage cell, a lithium-ion cell, etc. are used.

Such an electronic apparatus as described above is compact in size, and can be supplied with a certain amount of electricity irrespective of the arrangement and posture of the cell thereinside. Therefore, for example, a lap-top personal computer can be used while it is held by an arm and carried in this state, and a cellular phone or a digital camera can be used while it is roughly put in a chest pocket or a bag and carried around in this state. In this way, these electronic apparatuses can be used in all kinds of postures, in accordance with situations in which users use these apparatuses.

However, from the aspect of the efficiency of energy utilization, it can not be said that the primary cell or the secondary cell mounted on these electronic apparatuses is used efficiently. Now, researches and developments for an alternative fuel cell for replacing the above-described types of primary cells and secondary cells and for realizing a higher energy utilization efficiency are flourishing.

A fuel cell is for directly deriving an electric energy from a chemical energy by utilizing an electrochemical reaction between the fuel with oxygen in the air, and is regarded as a promising cell. However, in a fuel cell using a liquid fuel as the fuel, the fuel container for storing the fuel must be handled carefully. To be more specific, this type of fuel cell stores the fuel in a liquid state. Therefore, each time the posture of the fuel container for storing the fuel is changed, the fuel moves in the fuel container in a direction as gravitationally pulled. At this time, air bubbles may be included in the fuel in some case. In this case, since the fuel containing air bubbles flows out of the fuel container, the flux (amount of flux) of the fuel from the fuel container becomes unstable. As a result, the amount of supply of fuel to be supplied to an electricity generation module for generating electricity using the fuel stored in the fuel container becomes also unstable, causing a drop in the ability of generating electricity. Therefore, it is difficult to mount a fuel cell using a liquid fuel as the fuel on a portable compact electronic apparatus.

Hence, there is proposed a fuel container which can, irrespective of the posture of how it is held, stabilize the supply of fuel to the electricity generation module.

Specifically, Unexamined Japanese Patent Application KOKAI Publication No. 2001-93551 (particularly, the paragraphs nos. 0011 to 0019 and FIG. 1) discloses a fuel container having a liquid fuel osmosis member provided therein and also having a pore as an anti negative pressure mechanism formed at a predetermined position on the side surface of the container. While a negative pressure in the fuel container is adjusted by the air being introduced from the pore, the fuel osmosing into the liquid fuel osmosis member is supplied from the fuel container to a stack which is the electricity generation module, due to capillary attraction.

According to the fuel container disclosed in the above-indicated publication, the fuel securely contacts and osmoses into the liquid fuel osmosis member irrespective of the posture of how the fuel container is held. Therefore, the fuel flows out from the fuel container with no air bubbles contained therein, making it possible to stabilize the supply of the fuel to the electricity generation module. However, when the amount of the stored fuel becomes small, the fuel remaining in the fuel container does not contact and osmose into the liquid fuel osmosis member if the fuel container is laid or held obliquely. Due to this, not all the stored fuel can be let out from the fuel container. That is, the fuel container disclosed in the above-indicated publication can stabilize the flow-out of the fuel from the fuel container irrespective of its posture, but leaves some of the fuel therein depending on its posture.

DISCLOSURE OF INVENTION

An object of the present invention is to provide a fuel container which can let the fuel flow out therefrom irrespective of the posture of how the fuel container is held. To achieve the above object, a fuel container according to a first aspect of the present invention comprises:

a container body (15) for storing a fuel (10);
[a fuel (10) provided in the container body (15);]
a draining port (9) which is provided to the container body (15) in order to supply the fuel (10) to outside of the container body (15);
a fluid introduction unit (19) which introduces a fluid, which corresponds to flow-out of the fuel (10) from the draining port (9), into the container body (15); and
a swelling member (17) which communicates with the fluid introduction unit (19), and swells in the container body (15) by absorbing the fluid.

According to the present invention, the swelling member swells by absorbing the fluid introduced by the fluid introduction unit. Since the internal pressure of the container body rises due to the swell of the swelling member, the fuel in the container body can be let to flow out from the draining port. Irrespective of how the container body is postured, the swelling member continues to swell and expand as long as the fluid is supplied from outside. Accordingly, even if the fuel in the container body is getting reduced, the fuel always flows out from the draining port by receiving a pushing force by the swell and expansion of the swelling member. Therefore, in the above-described fuel container, once the fuel is supplied to outside, it continues to flow out from the container body irrespective of the posture of how the container body is held, making it possible to stably supply the fuel.

The fluid may be a product which is produced from the fuel (10) that flows out from the draining port (9). By introducing into the container body, the product which is produced in accordance with the amount of the fuel flowing out from the draining port, it is possible to compensate for the amount of the fuel flowing out from the container body with the amount of the introduced product, and thereby to keep the volume of the container body substantially uniform. However, even if the amount of flow-in of the product is smaller than the amount of flow-out of the fuel, the fuel remaining in the container body can be pressured by the swell of the swelling member. Therefore, irrespective of how the container body is postured, it is possible to maintain the state where the fuel is ready to be supplied from the draining port, even if the fuel in the container body is reduced.

The fuel container may comprise a highly viscous liquid (11) which is interveningly provided between the fuel (10) and the swelling member (17) in the container body (15). Even in a case where the fuel is under a higher pressure than the outside of the draining port is due to a pressure being applied internally to the container body, or in a case where the pressure outside the draining port is lower than the pressure in the container body, the fuel can be covered by the container body and the highly viscous liquid. Therefore, even if the pressure in the container body changes, a gaseous fluid is hardly mixed into the fuel. As a result, irrespective of how the fuel container is postured, once the fuel flows out to the outside from the draining port of the container body, the supply of the fuel can be stabilized, unless the pressures inside and outside the container body become equilibrated or acquiring means for acquiring the fuel from the draining port of the container body to the outside stops the acquisition. Since the fuel provided in the container body is kept in a state where it is sealed by the inner walls (except the draining port) of the container body and the highly viscous liquid, the fuel is hardly exposed to the air. Accordingly, the fuel provided in the container body can be prevented from being volatilized and reduced.

An absorption member (12) which can absorb the fuel (10) may be filled in the container body (15). Since the absorption member is filled in the container body, there acts an effect of the absorption member to draw the fuel to constantly absorb the fuel. Therefore, irrespective of how the fuel container is postured, a stable supply of the fuel is available.

A volume changing unit (8) which changes a volume of the container body (15) may be provided in the container body (15). In response to the volume of the container body being reduced by the volume changing unit, the pressure in the container body rises to make the fuel flow out from the draining port. Due to this, the fuel can be easily supplied from the draining port.

An absorption member (12) which can absorb the fuel (10) may be filled in the container body (15), and the absorption member (12) may shrink in response to a decrease in the volume of the container body (15) due to the volume changing unit (8). Since the absorption member swollen by absorbing the fuel shrinks in response to a decrease of the volume of the container body due to the volume changing unit, the fuel absorbed by the absorption member can easily be supplied from the draining port.

The volume changing unit (8) may be a bellows which is shrinkable and extendable in response to a stress. In a case where the volume changing unit is a shrinkable and extendable bellows provided in the container body, it is possible to securely make the fuel flow out from the draining port by decreasing the volume of the container body by shrinking the bellows.

The fuel container may comprise an external air introduction unit (14) which introduces external air into the container body (15). A decrease in the fuel in the container body can be compensated for by the external air introduction unit introducing external air.

The external air introduction unit (14) may be a venthole which communicates inside and outside of the container body (15). In a case where the external air introduction unit is a venthole, external air can easily be made to flow in and flow out through the venthole between the inside and outside of the container body. Accordingly, it is possible to adjust a negative voltage that works in the container body by introducing external air into the container body from the venthole as the external air introduction unit when the fuel flows out from the draining port of the container body.

The venthole as the external air introduction unit (14) may be provided with a selective permeation film which shuts off permeation of volatile components of the fuel (10) and selectively permits permeation of external air. In a case where the selective permeation film is provided to the vent hole as the external air introduction unit, the volatile components of the fuel can be prevented from being discharged to the outside of the container body. Therefore, the fuel provided in the container body can securely be prevented from being volatilized and reduced.

A check valve (13) which permits flow-out of the fuel (10) from the container body (15) to outside of the draining port (9) and prevents flow-in of the fuel (10) from the outside of the draining port (9) into the container body (15) may be provided inside the draining port (9). By the check valve restricting the direction of flow of the fuel to the normal direction, the fuel can be prevented from flowing in the reverse direction. That is, in a case where the fuel container is connected to an external pump, no gaseous body will be produced between the fuel container and the pump due to a negative pressure caused by a reverse flow of the fuel, because the fuel does not flow back into the fuel container. Accordingly, the pump can always stably transmit the fuel.

The fluid introduction unit (19) may be a path which connects to the swelling member (17) and through which the fluid can flow. Due to the fluid introduction unit, the swelling member can securely capture the fluid.

The swelling member (17) may be a compressed body which is obtained by compressing pulp, fiber, textile, or the like by adding thereto a water-soluble adhesive agent. Provided the swelling member is a compressed body to which a water-soluble adhesive agent is added, in a case where the fluid is water produced in a fuel cell, absorption of the produced water by the swelling member causes the water-soluble adhesive agent to melt. This makes the swelling member be freed from the compressed state and securely expand.

To achieve the above object, a fuel container according to a second aspect of the present invention comprises:

a container body (15) for storing a fuel (10) having a draining port (9);
    [a fuel (10) which is provided in the container body (15);] and
    a highly viscous liquid (11) which is provided in the container body (15) so as to contact the fuel (10) on a side counter to a side on which the draining port (9) exists.

Since the fuel provided in the container body has its one side counter to the draining port covered with the highly viscous liquid, it is kept in a state where it is sealed by the inner walls of the container body and the highly viscous liquid. Even in a case where the fuel is under a higher pressure than the outside of the draining port is due to a pressure being applied internally to the container body, or in a case where the pressure outside the draining port is lower than the pressure in the container body, a gaseous fluid is hardly mixed into the fuel even if a change in the pressures occurs. As a result, irrespective of how the fuel container is postured, i.e. irrespective of in which direction the draining port is oriented, once the fuel flows out to the outside from the draining port of the container body, the supply of the fuel can be stabilized, unless the pressures inside and outside the container body become equilibrated or acquiring means for acquiring the fuel from the draining port of the container body to the outside stops the acquisition. Since the fuel provided in the container body is kept in a state where it is sealed by the inner walls (except the draining port) of the container body and the highly viscous liquid, the fuel is hardly exposed to the air. Accordingly, the fuel provided in the container body can be prevented from being volatilized and reduced.

To achieve the above object, a fuel container according to a third aspect of the present invention comprises:
- a container body (15) for storing a fuel (10) having a draining port (9);
- [a fuel (10) which is provided in the container body (15);] and
- a volume changing unit (8) which changes a volume of the container body (15).

According to this fuel container, the pressure in the container body rises when the volume changing unit shrinks such that the volume of the container body is decreased. This makes it possible to supply the fuel from the draining port faster.

To achieve the above object, a fuel container according to a fourth aspect of the present invention comprises:
- a container body (15) for storing a fuel (10) having a draining port (9);
- [a fuel (10) which is provided in the container body (15);] and
- an absorption member (12) which is filled in the container body (15) and which can absorb the fuel (10).

According to this fuel container, since the absorption member in the container body absorbs the fuel, the fuel always moves toward the absorption member when it is decreasing. Therefore, the fuel can be efficiently and easily drawn to the draining port, and a stable supply of the fuel is available irrespective of how the fuel container is postured.

BRIEF DESCRIPTION OF DRAWINGS

These objects and other objects and advantages of the present invention will become more apparent upon reading of the following detailed description and the accompanying drawings in which.

BEST MODE FOR CARRYING OUT THE INVENTION

First Embodiment

Figure 1:
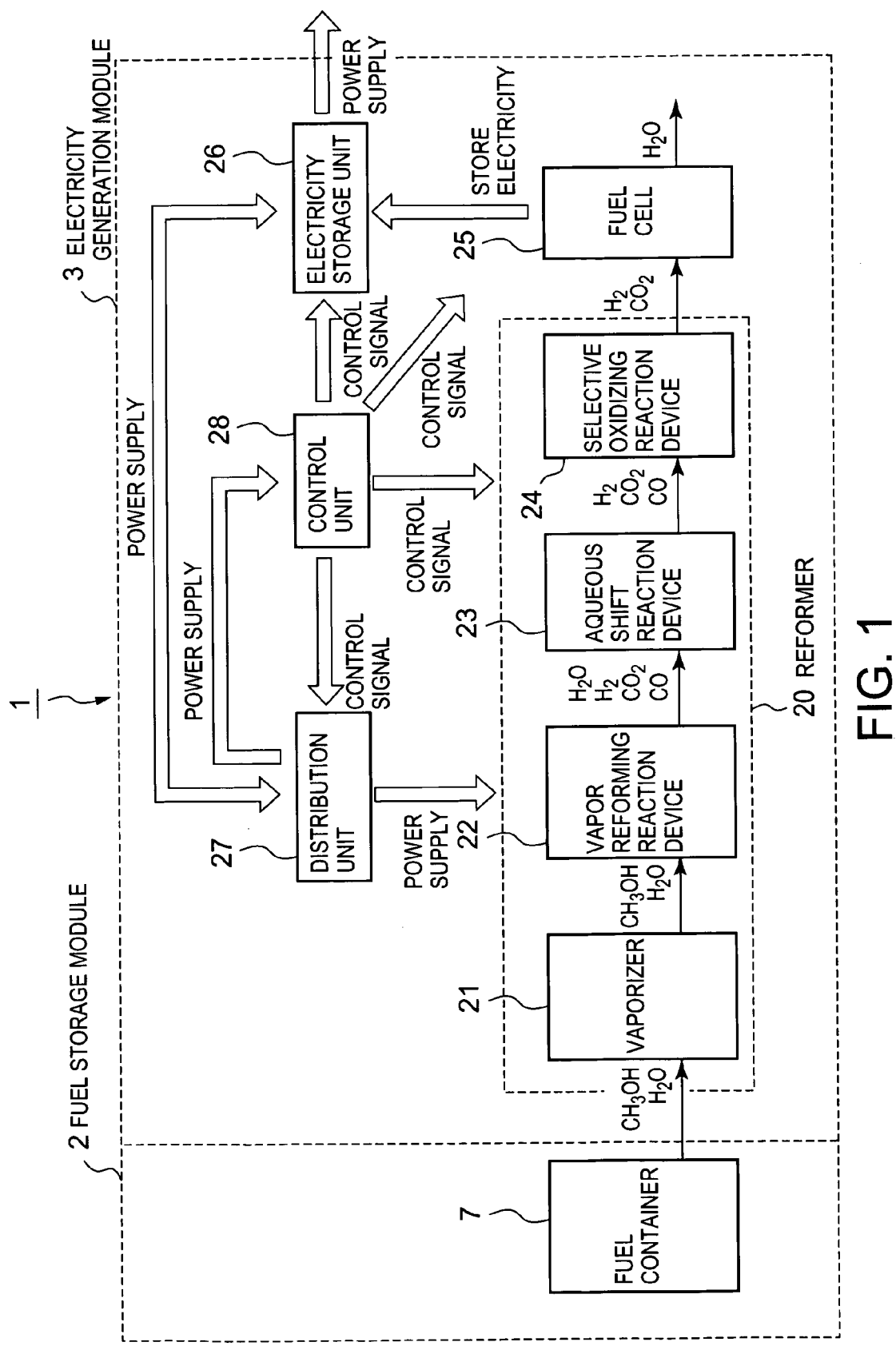
FIG. 1 is a block diagram showing a basic structure of an electricity generation system.

A first embodiment of the present invention will be explained with reference to the drawings. However, the scope of the invention is not limited to the example shown in the drawings.

Figure 2:
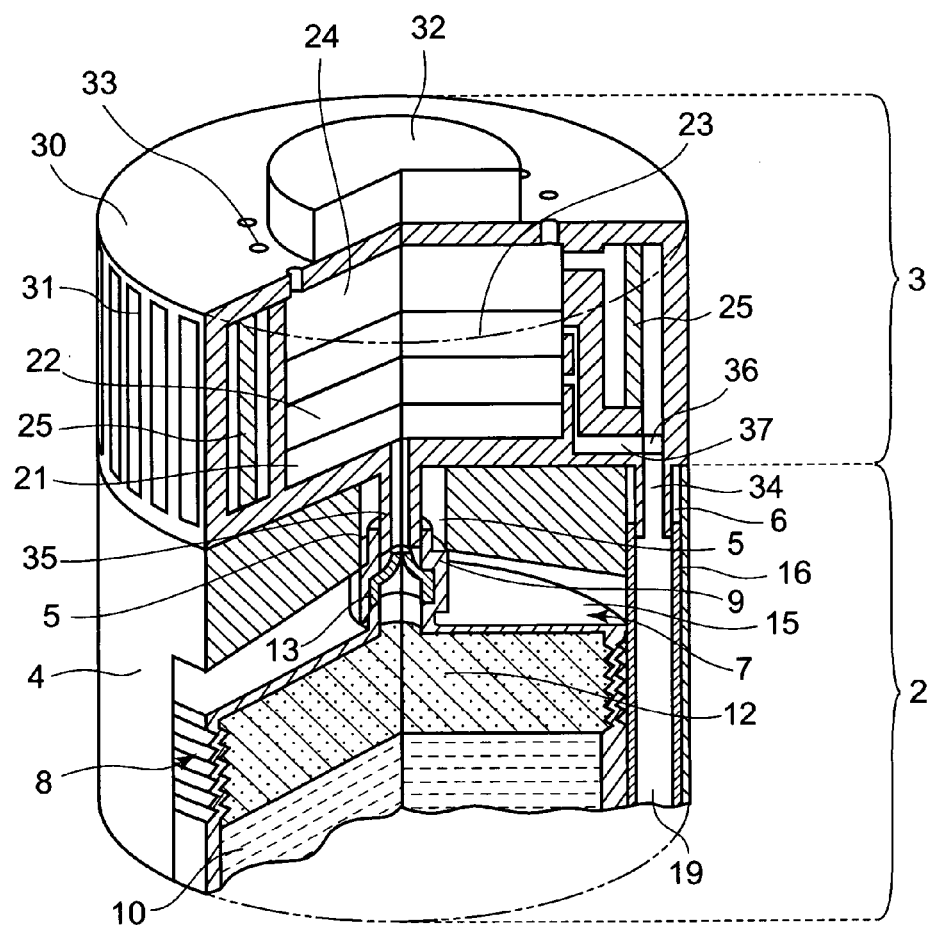
FIG. 2 is a partially cutaway perspective diagram showing schematic structures of a fuel storage module and an electricity generation module.

FIG. 1 is a block diagram showing the basic structure of an electricity generation system 1 which is provided with a fuel container 7 to which the present invention is applied. FIG. 2 is a partially cutaway perspective diagram showing a schematic structure of a fuel storage module 2 and an electricity generation module 3 which are provided in the electricity generation system 1. Note that FIG. 2 shows the structure of only one end of the fuel storage module 2, and omits the structure of the other end thereof.

As shown in FIG. 1, the electricity generation system 1 comprises the fuel storage module 2 for storing a fuel 10 (see FIG. 2 and FIG. 3), and the electricity generation module 3 for generating electricity using the fuel 10 stored in the fuel storage module 2. The fuel storage module 2 and the electricity generation module 3 are so structured as to be detachable from each other. The fuel storage module 2 has a substantially cylindrical housing 4, as shown in FIG. 2. A circular communication hole 5 is formed in the center of the top of the housing 4, and a communication hole 6 is formed at a position on the outer circumference of the top of the housing 4. A fuel container 7 is contained inside the housing 4.

Figure 3A:
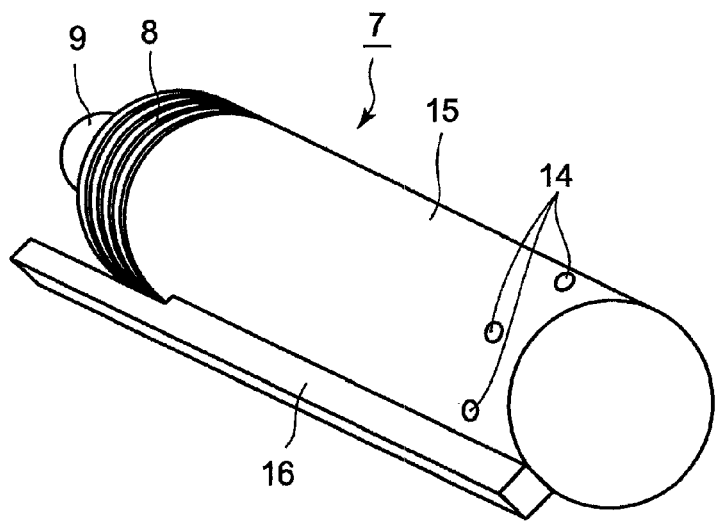
FIG. 3A is a perspective diagram showing an appearance of a fuel container and FIG. 3B is a cross sectional diagram showing an internal structure of the fuel container.
Figure 3B:
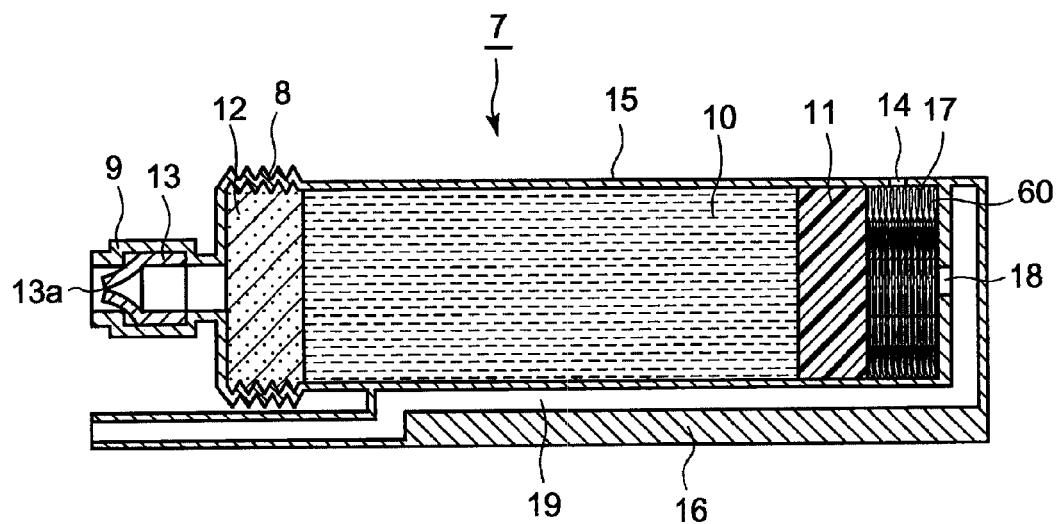

FIG. 3 are diagrams showing schematic structures of the fuel container 7, where FIG. 3A is a perspective diagram showing the appearance of the fuel container 7 and FIG. 3B is a cross sectional diagram showing the internal structure of the fuel container 7.

As shown in FIG. 3A, the fuel container 7 comprises a cylindrical container body 15 having a predetermined length. The container body 15 is made of a transparent or a semi-transparent member, polyethylene, polypropylene, polycarbonate, acryl, etc.

A plurality of external air introduction holes 14, 14, ... as external air introduction means for introducing the external air into the fuel container 7 are formed in the side surface of the back end portion of the container body 15 in such a manner as to be lined side by side along the circumferential direction of the container body 15. Each external air introduction hole 14 is a mere venthole for communicating the inside and the outside of the container body 15.

A draining port 9 is provided at the front end of the container body 15 so as to protrude from the container body 15. A bellows 8 as volume changing means which is shrinkable and extendable in the longitudinal direction of the fuel container 7 is formed adjacent to the draining port 9 of the container body 15. The container body 15 is so structured as to be increased in volume when the bellows 8 is extended and to be reduced in volume when the bellows 8 is shrunk.

A water introduction duct 16, through which water produced in the electricity generation module 3 circulates and which is for introducing the water into the container body 15, is provided at the side of the container body 15. The water introduction duct 16 extends in the longitudinal direction of the fuel container 7 from the front end portion to the back end portion of the fuel container 7.

As shown in FIG. 3B, a fuel 10 is stored inside the container body 15. Specifically, the fuel 10 is a mixture of a chemical fuel and water. A compound containing a hydrogen element, for example, alcohol such as methanol, ethanol, etc. or gasoline can be used as the chemical fuel. In the present embodiment, a mixture obtained by uniformly mixing methanol and water having the same mol percent as each other is used as the fuel 10. In the inside of the container body 15, a highly viscous liquid 111 is overlaid so as to completely cover the liquid surface of the fuel 10. Due to this, the fuel 10 is airtightly confined in the container body 15 by the internal wall of the container body 15 (except the draining port 9) and the highly viscous liquid 11. The highly viscous liquid 11 is a liquid having a higher viscosity than that of the fuel 10, specifically, a mineral oil such as polybutene, fluid paraffin, spindle oil, etc. or a silicon oil such as dimethylsilicon oil, methylfenylsilicon oil, etc. The highly viscous liquid 11 is colored with a coloring material such as pigments, dyes, etc. Further, it is preferred that the highly viscous liquid 11 be indissoluble or hardly dissoluble in the fuel 10.

The fuel 10 and the highly viscous liquid 11 are separate from each other without being mixed due to the aqueous or oleaginous characteristic thereof. The fuel 10 is stored in the container body 15 in a state completely sealed by the internal wall of the container 15 and the highly viscous liquid 11. Air or gas mixed in the interface between the fuel 10 and the highly viscous liquid 11 or mixed into the fuel 10 is sucked and eliminated in advance by a vacuum degassing device or the like. Therefore, hardly no (or no) air bubbles are included in the interface between the fuel 10 and the highly viscous liquid 11 or in the fuel 10.

A room 60 which is enclosed by the liquid surface of the highly viscous liquid 11 (i.e. the surface counter to the interface between the highly viscous liquid 11 and the fuel 10) and the internal wall of the container body 15 is filled with a swelling member 17 which swells by absorbing water. Specifically, the swelling member 17 is a compressed body which is obtained by compressing pulp, fiber, textile, or the like by adding a water-soluble adhesive agent. When the swelling member 17 absorbs water, the water-soluble adhesive agent melts, thereby freeing the swelling member 17 from the compressed solid state and letting the swelling member 17 gradually swell in accordance with the amount of water absorption. A water introduction hole 18 for introducing water to the swelling member 17 is formed in the back wall of the container body 15 that contacts the swelling member 17.

A portion inside the container body 15 that is near the draining port 9 is filled with an absorption member 12 for absorbing the fuel 10, in a state where the absorption member 12 is compressed. Specifically, the absorption member 12 is an oil-repellent porous member having a plurality of minute pores into which the highly viscous liquid 11 can not osmose, and has a high absorption property toward the fuel 10 in particular. Therefore, the highly viscous liquid 11 does not osmose into (or is not absorbed by) the absorption member 12, and the highly viscous liquid 11 does not flow out from the draining port 9. The absorption member 12 airtightly contacts the internal wall of the bellows 8 which is provided to the container body 15. The absorption member 12 shrinks when the volume of the container body 15 is reduced by shrinking the bellows 8. On the contrary, when the absorption member 12 absorbs the fuel 10 and swells, the bellows 8 extends and increases the volume of the container body 15.

A check valve 13 having a duckbill shape (a shape like a bill of a duck or a goose) is provided in the interior of the draining port 9 of the container body 15. The check valve 13 has a function for permitting the flux of the fuel 10 from a mouth 13a to the draining port 9 and preventing a reverse flow of the fuel 10 from the draining port 9 to the container body 15. When a pressure (positive pressure) for pushing the fuel 10 is applied to the fuel 10 absorbed into the absorption member 12, a stress works in a direction to push the mouth 13a open. Due to this, the fuel 10 is permitted to flow out from the mouth 13a to the draining port 9. On the other hand, when a pressure is applied to the check valve 13 from the draining port 9 due to the inside of the container body 15 being a negatively pressurized state, a stress works in a direction to close the mouth 13a. Thus, a reverse flow from the draining port 9 to the container body 15 can be prevented. According to the present embodiment, as will be described later, when a positive pressure is applied to the inside of the container body 15, the fuel 10 can flow out from the inside of the container body 15 to the outside of the draining port 9 through the check valve 13. Further, as described above, the check valve 13 closes the mouth 13a when a negative pressure is applied to the inside of the container body 15 in order to prevent a reverse flow of a fluid such as the fuel 10 from the check valve 13.

Inside the water introduction duct 16 provided at the side of the container body 15, there is provided a path 19 as fluid introduction means through which water as a fluid produced in the electricity generation module 3 circulates. The path 19 extends from the front end of the water introduction duct 16 substantially along the water introduction duct 16, and bends at the back end of the water introduction duct 16 to communicate with the room 60 via the water introduction hole 18 of the container body 15. The diameter of the path 19 is set in such a manner as that water generated in the electricity generation module 3 can circulate through the path 19 by capillary attraction.

The fuel container 7 having the above-described structure is detachably contained in the housing 4 of the fuel storage module 2, such that the draining port 9 is inserted into the communication hole 5 and the front end portion of the water introduction duct 16 is inserted into the communication hole 6, as shown in FIG. 2. In the state where the fuel container 7 is set at a predetermined position of the fuel storage module 2, a part of the outer circumferential surface of the container body 15 constituting the fuel container 15 is exposed to the outside of the housing 4. Further, as described above, the container body 15 is transparent or semitransparent and the highly viscous liquid 11 is colored. Therefore, in the state where the fuel container 7 is set to the fuel storage module 2, the displacement of the liquid surface of the highly viscous liquid 11 is visibly recognizable through the container body 15, making it possible to easily confirm the existence or inexistence of the fuel 10 or the remaining amount of the fuel 10.

Further, as described above, the external air introduction holes 14, 14, . . . as the external air introduction means formed in the container body 15 are mere ventholes. However, each external air introduction hole 14 may be provided with a selective permeation film having a function for preventing permeation therethrough of a volatile component of the fuel 10 instead of the highly viscous liquid 11 and a function for selectively permitting permeation therethrough of only the external air (air). In this case, it is possible to prevent the volatile components of the fuel 10 from being discharged to the outside of the container body 15 and thereby to prevent the fuel 10 stored in the container body 15 from being volatilized and thus reduced.

Next, the electricity generation module 3 will be explained.

As shown in FIG. 1, the electricity generation module 3 comprises a reformer 20 for reforming the fuel 10 supplied from the fuel container 7. The reformer 20 includes a vaporizer 21, a vapor reforming reaction device 22, an aqueous shift reaction device 23, and a selective oxidizing reaction device 24. The electricity generation module 3 further comprises a fuel cell 25 for generating electricity using the fuel 10 reformed by the reformer 20, an electricity storage unit 26 for storing an electric energy generated by the fuel cell 25 and supplying the stored electric energy in accordance with necessity, a distribution unit 27 for distributing the electric energy supplied from the electricity storage unit 26 to the whole electricity generation module 3, and a control unit 28 for electronically controlling the reformer 20, the fuel cell 25, the electricity storage unit 26, and the distribution unit 27.

As shown in FIG. 2, the electricity generation module 3 has a substantially cylindrical housing 30. The vaporizer 21, the vapor reforming reaction device 22, the aqueous shift reaction device 23, and the selective oxidizing reaction device 24 are provided inside the housing 30 in a manner that they are overlaid in this order. The fuel cell 25 is further provided inside the housing 30 so as to surround the vaporizer 21, the vapor reforming reaction device 22, the aqueous shift reaction device 23, and the selective oxidizing reaction device 24. A plurality of slits 31, 31, . . . for breathing in the oxygen in the air are formed in parallel with each other outside the fuel cell 25 in the outer circumferential surface of the housing 30.

A terminal 32 for supplying an electric energy from the electricity storage unit 26 (see FIG. 1) to an external device is provided at the top of the housing 30. A plurality of ventholes 33, 33, . . . are formed around the terminal 32 at the top of the housing 30.

Pipes 34 and 35 are provided at the bottom of the housing 30 so as to protrude downward in order to fit to the fuel storage module 2. The pipe 34 is for circulating water generated in the electricity generation module 3, and the pipe 35 is for breathing in the fuel 10 from the fuel container 7. The pipe 34 is provided with a valve 36, and a pipe 37 provided in the housing 30 communicates with the pipe 34 via the valve 36.

Processes of chemical reactions occurring in the reaction devices of the reformer 20 and in the fuel cell 25 will now be explained.

The vaporizer 21 vaporizes the fuel 10 by heating the fuel 10 supplied through the pipe 35 from the fuel container 7 of the fuel storage module 2. The mixed gas vaporized by the vaporizer 21 is supplied to the vapor reforming reaction device 22.

The vapor reforming reaction device 22 reforms the mixed gas supplied from the vaporizer 21 into a hydrogen gas and a carbon dioxide gas by using a reforming catalyst, as shown by the chemical reaction formula (1) below.

$$CH_3OH+H_2O \rightarrow 3H_2+CO_2 \qquad (1)$$

The mixed gas supplied from the vaporizer 21 may not necessarily be reformed completely into a hydrogen gas and a carbon dioxide gas. In this case, a little carbon monoxide gas is generated in the vapor reforming reaction device 22, as shown by the chemical reaction formula (2) below.

$$2CH_3OH+H_2O \rightarrow 5H_2+CO+CO_2 \qquad (2)$$

The hydrogen gas, the carbon dioxide gas, and the carbon monoxide gas generated in the vapor reforming reaction device 22, and the unreacted vapor are supplied to the aqueous shift reaction device 23.

The aqueous shift reaction device 23 causes an aqueous shift reaction by using the carbon monoxide gas included in the mixed gas (hydrogen gas, carbon dioxide gas, vapor, and carbon monoxide gas) supplied from the vapor reforming reaction device 22 and a catalyst, as shown by the chemical reaction formula (3) below.

$$CO+H_2O \rightarrow CO_2+H_2 \qquad (3)$$

The vapor unreacted in the vapor reforming reaction device 22 is used in the aqueous shift reaction. Due to this, the density of the vapor and carbon monoxide gas in the mixed gas becomes extremely thin. The mixed gas (including the hydrogen gas, the carbon dioxide gas, and the carbon monoxide gas) is supplied from the aqueous shift reaction device 23 to the selective oxidizing reaction device 24.

The selective oxidizing reaction device 24 selects the carbon monoxide gas from the mixed gas supplied from the aqueous shift reaction device 23 by a catalyst, and oxidizes the carbon monoxide gas as shown by the chemical reaction formula (4) below.

$$2CO+O_2 \rightarrow 2CO_2 \qquad (4)$$

The oxygen in the left side of the chemical reaction formula (4) is acquired into the selective oxidizing reaction device 24 from the atmosphere through the plurality of ventholes 33, 33, . . . formed in the electricity generation module 3. Further, since the selective oxidizing reaction device 24 is provided with a catalyst for selectively promoting the chemical reaction shown by the chemical reaction formula (4), the hydrogen included in the mixed gas is hardly oxidized. The mixed gas supplied from the selective oxidizing reaction device 24 to the fuel cell 25 includes almost no carbon monoxide gas, and the purity of the hydrogen gas and carbon dioxide gas is very high. If the selective oxidizing reaction device 24 is provided with a mechanism for separating hydrogen from the other nonpoisonous byproducts, the byproducts may be discharged from the ventholes 33, 33, . . . .

The fuel cell 25 comprises a fuel electrode (anode) to which minute particles of a catalyst are adhered, an air electrode (cathode)) to which minute particle of a catalyst are adhered, and an ion transmission film interveningly provided between the fuel electrode and the air electrode. The mixed gas is supplied to the fuel electrode from the selective oxidizing reaction device 24, and an oxygen gas in the air is supplied to the air electrode through the plurality of slits 31, 31, . . . provided in the outer circumferential surface of the electricity generation module 3.

When the hydrogen gas is supplied to the fuel electrode, hydrogen ions from which electrons are dissociated by the catalyst adhered to the fuel electrode are produced, as shown by the electrochemical reaction formula (5) below. The produced hydrogen ions are transmitted to the air electrode through the ion transmission film, and thus electrons are acquired from the fuel electrode. The carbon dioxide gas included in the mixed gas supplied from the selective oxidizing reaction device 24 is emitted to the outside without being reacted.

$$3H_2 \rightarrow 6H^+ + 6e^- \qquad (5)$$

On the other hand, when an oxygen gas is supplied to the air electrode, the hydrogen ions having transmitted through the ion transmission film, the oxygen gas, and the electrons are reacted to produce water, as shown by the electrochemical reaction formula (6) below.

$$6H^+ + 3/2O_2 + 6e^- \rightarrow 3H_2O \qquad (6)$$

By the electrochemical reactions described above taking place in the fuel cell 25, an electric energy is generated. The generated electric energy is stored in the electricity storage unit 26.

The vaporizer 21, the vapor reforming reaction device 22, the aqueous shift reaction device 23, and the selective oxidizing reaction device 24 serve as a microreactor for vaporizing a fluid flowing through a micropath formed in a small-sized substrate made of silicon, aluminum alloy, or glass, or for causing a chemical reaction in at least a part of the fluid. The structures of the vaporizer 21, the vapor reforming reaction device 22, the aqueous shift reaction device 23, and the selective oxidizing reaction device 24 will now be explained below.

Figure 4:
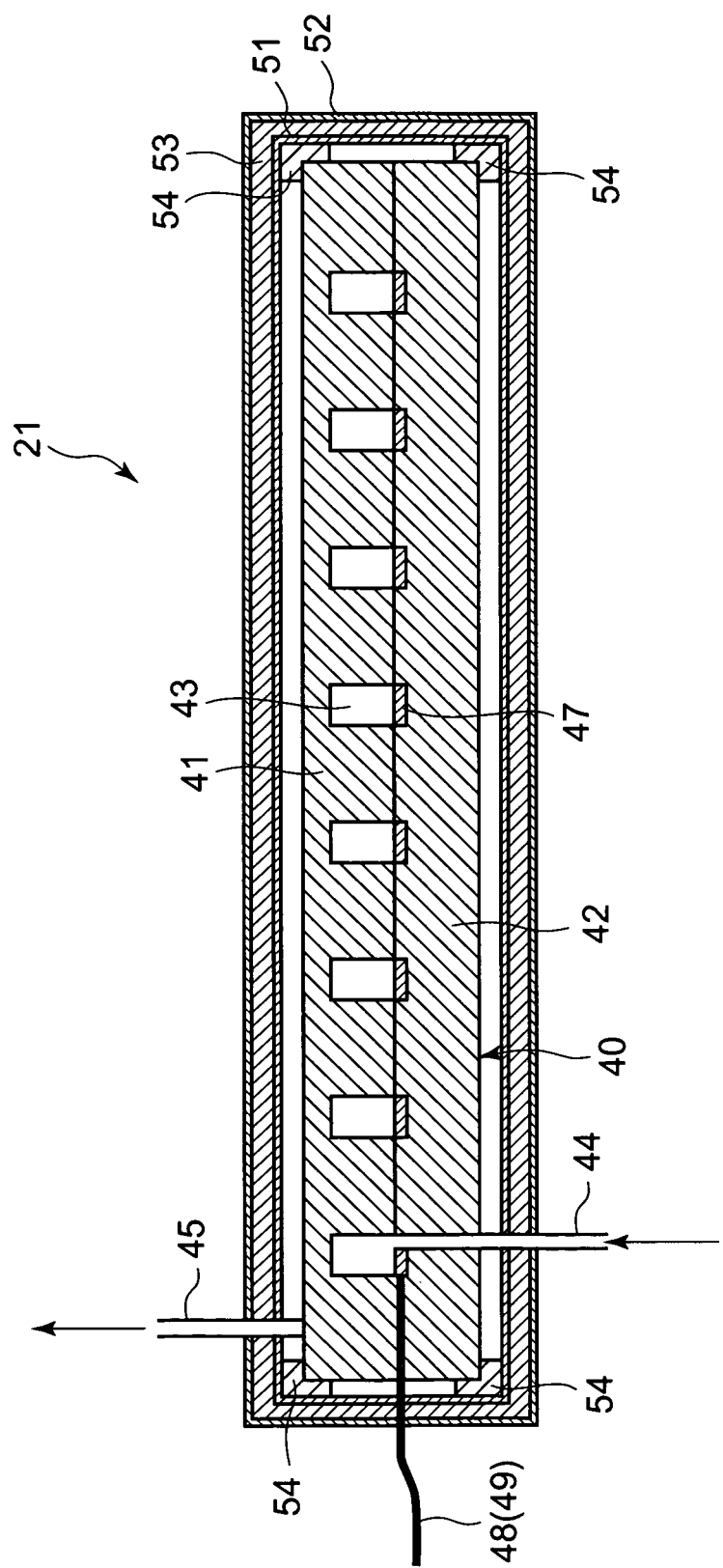
FIG. 4 is a cross sectional diagram showing a vaporizer.
Figure 5:
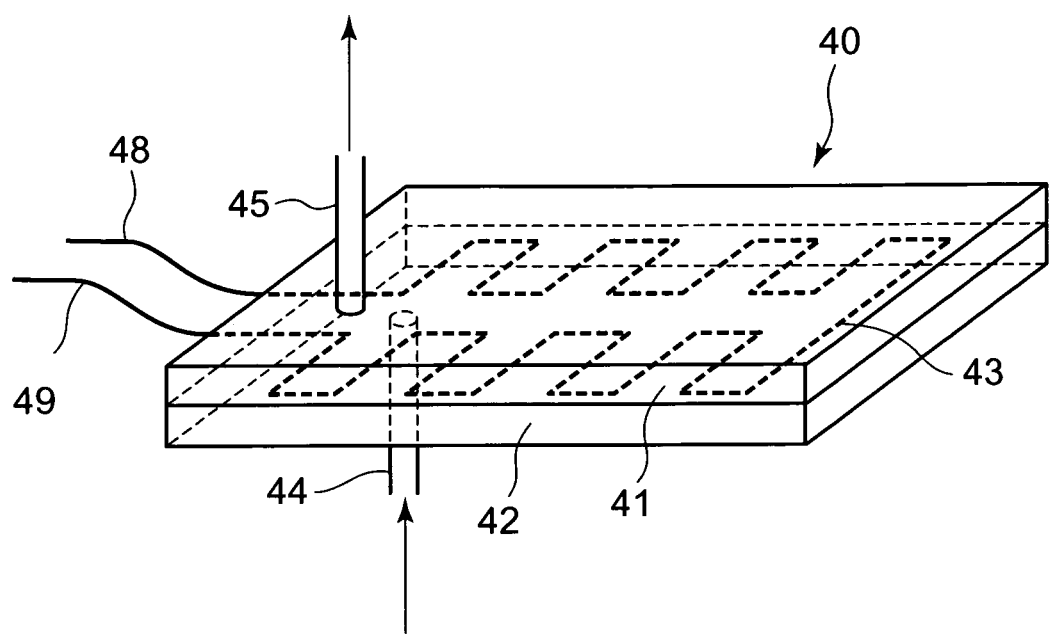
FIG. 5 is a perspective diagram showing an appearance of a furnace of the vaporizer.

FIG. 4 is a cross sectional diagram of the vaporizer 21, and FIG. 5 is a perspective diagram of a thermofurnace 40 provided with the vaporizer 21.

As shown in FIG. 4, the vaporizer 21 has a rectangular-parallelepiped-shaped glass container 53 made of a low melting point glass. Radiation shield films 51 and 52 made of aluminum or the like are formed on the inner wall and outer wall of the glass container 53. The radiation shield films 51 and 52 have a high reflectivity to an electromagnetic wave including infrared rays, and reflects an electromagnetic wave radiated from the later-described thermofurnace 40 inwards into the glass container 53. Due to this, the electromagnetic wave radiated from the thermofurnace 40 is shielded so as not to be transmitted to the outside of the glass container 53, making it possible to prevent the radiation heat generated by the electromagnetic wave radiated from the thermofurnace 40 from being scattered to the outside of the glass container 53.

Support members 54, 54, . . . are provided on the inner side of the radiation shield film 51 formed on the inner wall of the glass container 53 at portions corresponding to the corners of the glass container 53, The thermofurnace 40 is provided inside the glass container 53 while being supported by the support members 54, 54, . . . . Note that the thermofurnace 40 is separate from the inner wall of the glass container 53.

As shown in FIG. 4, the thermofurnace 40 has a structure formed by overlaying two substrates 41 and 42 and jointing them. Each of the substrates 41 and 42 is made of a material such as silicon crystal, aluminum, glass, etc. As shown in FIG. 5, a winding micropath 43 is formed in the jointing interface between the substrates 41 and 42.

The micropath 43 is formed by jointing the substrate 41 and the substrate 42 in such a manner that a winding groove formed in one surface of the substrate 41 is opposed to the substrate 42. The micropath 43 is sealed between the substrate 41 and the substrate 42. The groove that constitutes the micropath 43 is formed by applying photolithography, etching or the like to one surface of the substrate 41.

As shown in FIG. 4 and FIG. 5, an end of a flow-out pipe 45 is connected to one end of the micropath 43. The flow-out pipe 45 penetrates the substrate 41, the radiation shield films 51 and 52, and the glass container 53 to be drawn out from the thermofurnace 40 to the outside of the glass container 53. An end of a flow-in pipe 44 is connected to the other end of the micropath 43. Likewise the flow-out pipe 45, the flow-in pipe 44 penetrates the substrate 42, the radiation shield films 51 and 52, and the glass container 53 to be drawn out from the thermofurnace 40 to the outside of the glass container 53. The flow-in pipe 44 communicates with the pipe 35, so that the fuel 10 stored in the fuel container 7 can anytime flow into the micropath 43 through the pipe 35 and the flow-in pipe 44 by a pressure applied to the inside of the container body 15.

As shown in FIG. 4, a heat generation resistor film 47 which is winding correspondingly to the micropath 43 is formed at the jointing interface between the substrate 42 and the substrate 41. In the state where the substrate 41 and the substrate 42 are jointed together, the heat generation resistor film 47 overlaps on the groove constituting the micropath 43 and forms the floor of the micropath 43. The heat generation resistor film 47 is formed along the micropath 43 from the one end to the other end of the micropath 43.

A lead line 48 is connected to the heat generation resistor film 47 at the one end of the micropath 43, and a lead line 49 is connected to the heat generation resistor film 47 at the other end of the micropath 43. Each of the lead lines 48 and 49 are made of a metallic material which is very low in resistivity and chemically stable such as gold, white gold, nickel, etc. The electric resistivity of the lead lines 48 and 49 is set much lower than the electric resistivity of the heat generation resistor film 47.

As shown in FIG. 4, the lead lines 48 and 49 penetrate radiation shield films 51 and 52 and the glass container 53 to be drawn out from the thermofurnace 40 to the outside of the glass container 53, while being sandwiched between the two substrates 41 and 42. The lead line 48 is connected to one electrode of the distribution unit 27 outside the glass container 53, and the lead line 49 is connected to the other electrode of the distribution unit 27 outside the glass container 53.

The distribution unit 27 controls the temperature of the heat generation resistor film 47 by changing the electricity supplied to the heat generation resistor film 47 in accordance with a control signal from the control unit 28. Due to this, the distribution unit 27 suitably adjusts the amount of vaporization of the fuel 10 per unit time in the vaporizer 21 and a later-described degree of progression of reactions in the vapor reforming reaction device 22, the aqueous shift reaction device 23, and the selective oxidizing reaction device 24. For example, the distribution unit 27 is so structured as to be able to change the current to be let flow through the lead lines 48 and 49 as long as the voltage to be applied by the distribution unit 27 is fixed. Further, the distribution unit 27 is so structured as to be able to change the voltage to be applied to the lead line 48 to the lead line 49 as long as the current let flow by the distribution unit 27 is fixed. Needless to say, the distribution unit 27 may be able to change both the voltage and the current, and may perform any of direct current drive and alternating current drive.

The control unit 28 comprises a computing device constituted by a general-purpose CPU (Central Processing Unit) or the like, or a dedicated logic circuit. The control unit 28 has a function for feeding back a signal representing the voltage and current of the distribution unit 27 and adjusting the electricity to be supplied from the distribution unit 27 to the heat generation resistor film 47. The temperature of the heat generated by the heat generation resistor film 47 is adjusted by this structure.

In the vaporizer 21 having the above-described structure, the glass container 35 has an airtight space inside, with the flow-in pipe 44, the flow-out pipe 45, and the lead lines 48 and 49 penetrating the radiation shield films 51 and 52 and the glass container 53. The internal space of the glass container 53 is in a vacuum state where the atmospheric pressure is very low. Accordingly, there is almost no catalyst for propagating heat inside the glass container 53. This makes it possible to prevent heat from being discharged from the thermofurnace 40 to the outside of the glass container 35.

Figure 6:
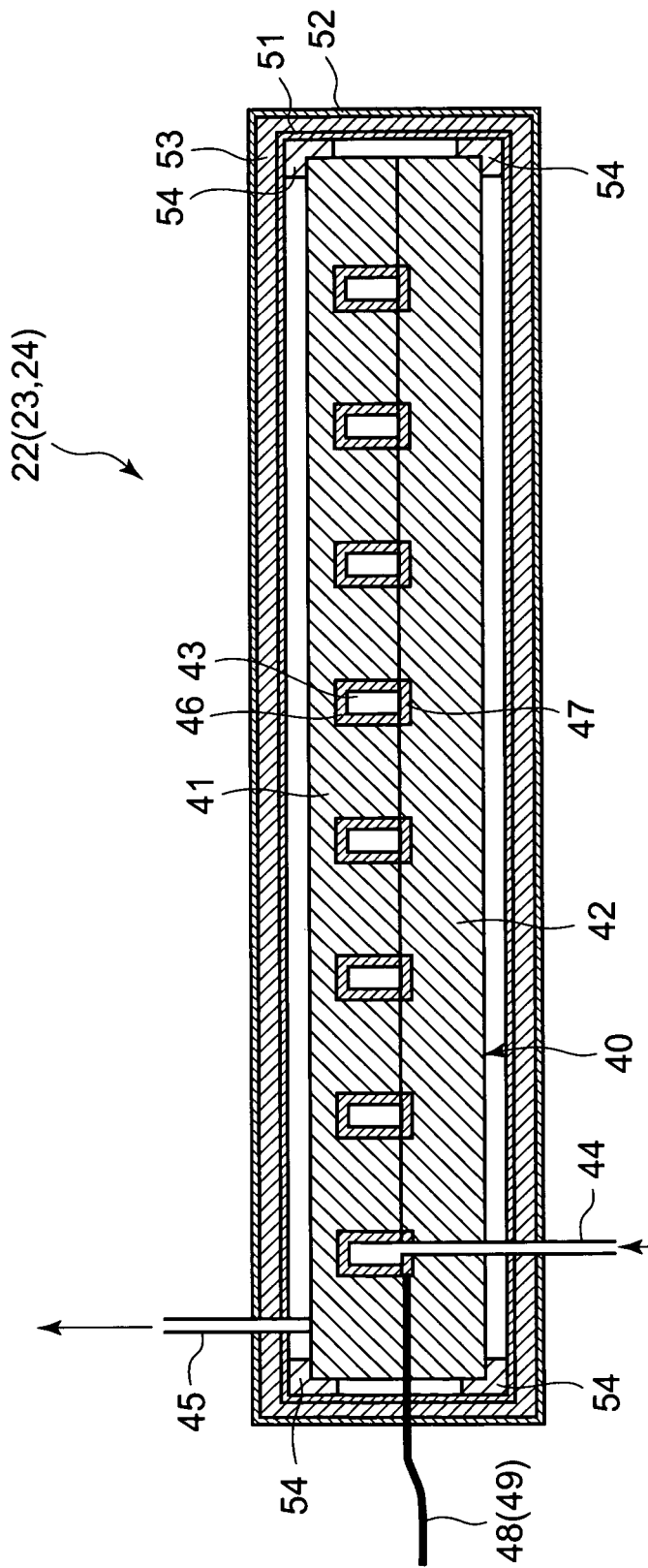
FIG. 6 is a cross sectional diagram showing each of a vapor reforming reaction device, a aqueous shift reaction device, and a selective oxidizing reaction device.

FIG. 6 is a cross sectional diagram showing the vapor reforming reaction device 22, the aqueous shift reaction device 23, or the selective oxidizing reaction device 24. In the vapor reforming reaction device 22, the aqueous shift reaction device 23, or the selective oxidizing reaction device 24 shown in FIG. 6, the same components as those in the vaporizer 21 are denoted by the same reference numerals and explanation for such components will be omitted.

As shown in FIG. 6, each of the vapor reforming reaction device 22, the aqueous shift reaction device 23, and the selective oxidizing reaction device 24 has substantially the same structure as the vaporizer 21. However, in particular, the flow-in pipe 44 of the vapor reforming reaction device 22 communicates with the flow-out pipe 45 of the vaporizer 21, and the flow-out pipe 45 of the vapor reforming reaction device 22 communicates with the flow-in pipe 44 of the aqueous shift reaction device 23. The flow-out pipe 45 of the aqueous shift reaction device 23 communicates with the flow-in pipe 44 of the selective oxidizing reaction device 24. The flow-out pipe 45 of the selective oxidizing reaction device 24 communicates with the fuel electrode of the fuel cell 25. Further, as shown in FIG. 2, the vaporizer 21, the vapor reforming reaction device 22, the aqueous shift reaction device 23, and the selective oxidizing reaction device 24 are overlaid in this order. At this time, the respective reaction devices are overlaid such that the radiation shield film 52 covering the outer wall contacts the radiation shield film 52 of the adjacent reaction devices.

In any of the vapor reforming reaction device 22, the aqueous shift reaction device 23, and the selective oxidizing reaction device 24, a reforming catalyst film 46 is formed on the inner walls and ceiling of the micropath 43 (i.e. the wall surfaces of the groove of the substrate 41) along the micropath 43 from the one end to the other end thereof. The reforming catalyst film 46 is for producing hydrogen by reforming the chemical fuel included in the fuel 10. The element, kind, etc. of the reforming catalyst film 46 may be different between the vapor reforming reaction device 22, the aqueous shift reaction device 23, and the selective oxidizing reaction device 24. In the vapor reforming reaction device 22, the chemical reaction shown by the chemical reaction formula (1) is promoted by the reforming catalyst film 46. In the aqueous shift reaction device 23, the chemical reaction shown by the chemical reaction formula (3) is promoted by the reforming catalyst film 46. In the selective oxidizing reaction device 24, the chemical reaction shown by the chemical reaction formula (4) is promoted by the reforming catalyst film 46.

The method of using the electricity generation system 1 and the operation of the electricity generation system 1 will now be explained.

Figure 7A:
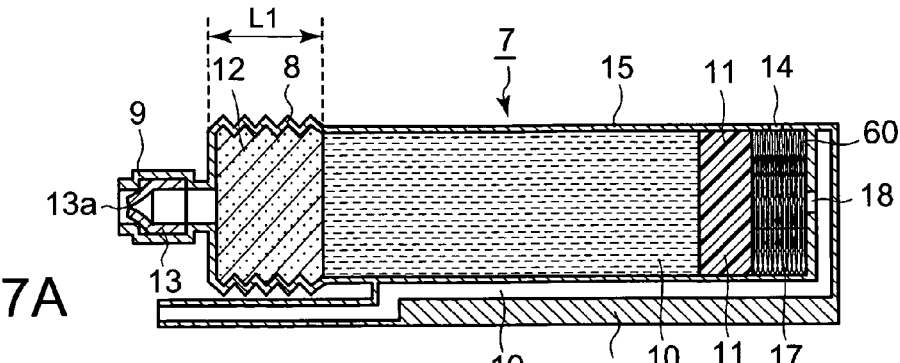
FIG. 7A to 7D are diagrams showing changes happening in the fuel container when a fuel is supplied from the fuel container to the electricity generation module.

First, in order to supply the fuel 10 to the electricity generation module 3, the fuel container 7 storing the fuel 10 has to be set at a predetermined position of the housing 4 constituting the fuel storage module 2. As shown in FIG. 7A, in the fuel container 7 before being set, the check valve 13 is closed, the absorption member 12 absorbs the fuel 10 to be swollen, and the bellows 8 is extended to have a length L1.

Figure 7B:
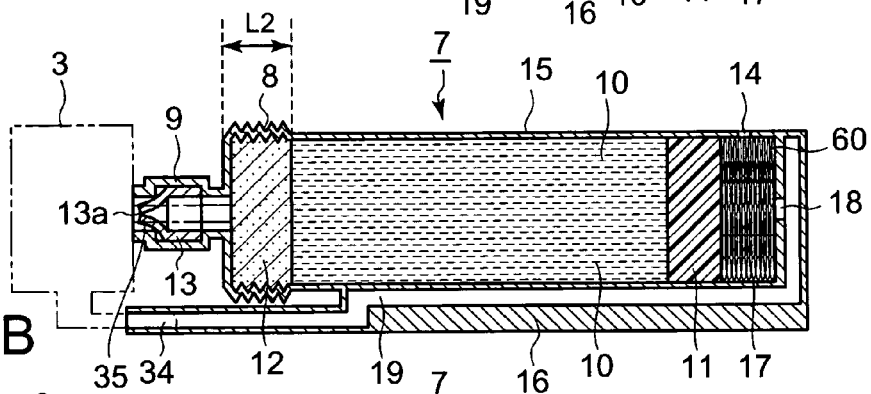

The fuel container 7 being in the state shown in FIG. 7A is set at the predetermined position of the housing 4 constituting the fuel storage module 2. After this, the fuel container 7 is pushed toward the electricity generation module 3 such that the front end portions of the draining port 9 and water introduction duct 16 are inserted to the communication holes 5 and 6 respectively. Thereby, the pipe 34 of the electricity generation module 3 is inserted into the water introduction duct 16 as shown in FIG. 7B.

At the same time, by the fuel container 7 being pushed toward the electricity generation module 3, the front end portion of the draining port 9 abuts on the bottom of the housing 30 constituting the electricity generation module 3, thereby applying a force to the container body 15 in a direction to shrink the bellows 8. Due to this, the bellows 8 of the fuel container 7 is shrunk to have a length L2 which is shorter than the length L1. The absorption member 12 shrinks in accordance with the length L2 of the bellows 8. The fuel 19 absorbed by the absorption member 12 is drained from the absorption member 12 by the shrinkage of the absorption member 12. At this time, since the volume of the container body 15 is reduced by the shrinkage of the bellows 8, the pressure in the container body 15 rises and the fuel 10 concentrates to the draining port 9 as driven away. Due to this, the pressure of the fuel 10 is applied to the check valve 13 of the draining port 9, and the check valve 13 let the fuel 10 flow out from the draining port 9 to the pipe 35 for a while. This balances the pressures inside and outside the container body 15. The flowing-out fuel 10 is supplied to the vaporizer 21 through the pipe 35 and the flow-in pipe 44 of the vaporizer 21. Thus, the supply of the fuel 10 from the fuel storage module 2 to the electricity generation module 3 is started.

While the supply of the fuel 10 is started in this manner, a control signal for driving the reformer 20 is input from the control unit 28 to the distribution unit 27. Then, an electric power is supplied from the distribution unit 27 to the heat generation resistor film 47 of the vaporizer 21, the vapor reforming reaction device 22, the aqueous shift reaction device 23, and the selective oxidizing reaction device 24 via the lead lines 48 and 49 to cause the heat generation resistor film 47 to generate heat. The control unit 28 feeds back a signal representing the voltage and current to be supplied by the distribution unit 27 to the heat generation resistor film 47 of the vaporizer 21, the vapor reforming reaction device 22, the aqueous shift reaction device 23, and the selective oxidizing reaction device 24, in order to control the voltage and current of the distribution unit 27 such that each heat generation resistor film 47 generates heat having a predetermined temperature.

At this time, the fuel 10 is supplied into the thermofurnace 40 of the vaporizer 21 from the fuel container 7 through the pipe 35 of the heat generation module 3 and the flow-in pipe 44 of the vaporizer 21. The supplied fuel 10 is vaporized by the heat generated by the heat generation resistor film 47. This raises the atmospheric pressure in the vaporizer 21 and causes a convection. Due to this, the fuel 10 being in the liquid state changes its phase into a mixed gas of methanol and water. The mixed gas circulates from the vaporizer 21 to the vapor reforming reaction device 22, the aqueous shift reaction device 23, the selective oxidizing reaction device 24, and to the fuel cell 25 in this order.

In the vapor reforming reaction device 22, the mixed gas flows through the micropath 43 from the flow-in pipe 44 to the flow-out pipe 45. While flowing through the micropath 43, the mixed gas is heated by the heat generation resistor film 47. The mixed gas is promoted by the reforming catalyst film 46 to cause the reactions shown by the chemical reaction formulae (1) and (2). If plenty of water is produced due to the reaction shown by the chemical reaction formula (2), the produced water may be let out from the pipe 37 to the pipe 34 by the valve 36.

In the aqueous shift reaction device 23, the mixed gas is heated by the heat generation resistor film 47 while flowing through the micropath 43, and causes the reaction shown by the chemical reaction formula (3). Likewise in the selective oxidizing reaction device 24, the mixed gas is heated by the heat generation resistor film 47 while flowing through the micropath 43, the causes the reaction shown by the chemical reaction formula (4). The hydrogen produced by the vapor reforming reaction device 22, the aqueous shift reaction device 23, and the selective oxidizing reaction device 24 is supplied to the fuel electrode of the fuel cell 25. In the fuel cell 25, the electrochemical reactions shown by the electrochemical reaction formulae (5) and (6) are caused thereby generating an electric energy. The generated electric energy is stored in the electricity storage unit 26 or supplied to the outside via the terminal 32.

Further, in the fuel cell 25, water is produced along with the electrochemical reaction shown by the electrochemical reaction formula (6). The water as a fluid produced by the fuel cell 25 (hereinafter referred to as "produced water") flows through the pipe 34 via the valve 36 due to the continuous produced water and capillary attraction, and flows into the water introduction duct 16 of the fuel container 7 from the pipe 34.

The produced water may partially introduced into the vapor reforming reaction device 22 via the pipe 37 controlled by the valve 36, as the water shown in the left side of the chemical reaction formulae (1) and (3). With this introduction, it is possible to decrease the density of the water in the fuel 10 and increase the density of the chemical fuel in the fuel 10.

Figure 7C:
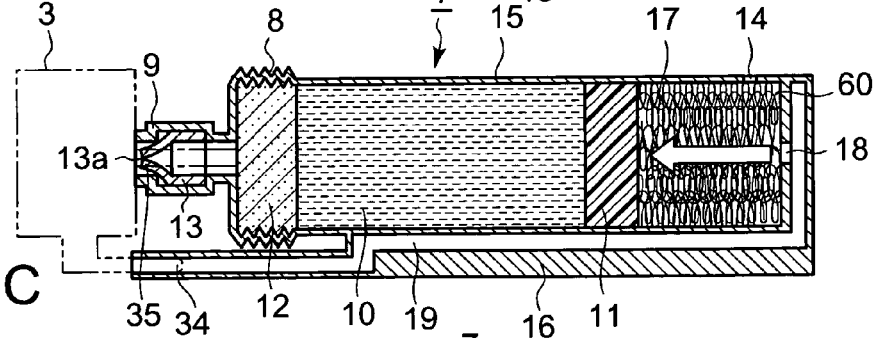

The produced water flowing into the water introduction duct 16 of the fuel container 7 flows through the path 19 of the water introduction duct 16 due to the following produced water and capillary attraction and reaches the water introduction hole 18 of the container body 15 to be introduced into the room 60 of the container body 15 from the water introduction hole 18. As shown in FIG. 7C, the introduced produced water is absorbed by the swelling member 17. Due to this, the water-soluble adhesive agent of the swelling member 17 is freed from the compressed solid state to melt, and the swelling member 17 gradually swells in accordance with absorption amount of the produced water. As the swelling member 17 swells, the air is introduced into the room 60 from the external air introduction holes 14, 14, . . . of the container body 15. The swelling member 17 swells by absorbing the produced water and expands by breathing in the introduced air, to be restored to the state before it is compressed and solidified.

According to the present embodiment, since each external air introduction hole 14 is a very minute penetration hole, the produced water introduced into the room 60 and the swollen and expanded swelling member 17 will not be leaked from each external air introduction hole 14.

As indicated by an arrow in FIG. 7C, the swell and expansion of the swelling member 17 makes the swelling member 17 push the highly viscous liquid 11. The highly viscous liquid 11 is displaced by receiving the pushing force of the swell and expansion of the swelling member 17. Due to this, the fuel 10 absorbed by the absorption member 12 is sequentially let to flow out from the draining port 9 through the pipe 35 of the electricity generation module 3.

The end surface of the swelling member 17 that faces the highly viscous liquid 11 may be solidified by an adhesive agent indissoluble in the produced water and the highly viscous liquid 11, and a sheet member may intervene between the highly viscous liquid 11 and the swelling member 17. In this case, it is possible to prevent the swelling member 17 from breaking the liquid surface of the highly viscous liquid 11. Further, it is possible to effectively transmit the effect caused by the swell and expansion of the swelling member 17 to over the entire liquid surface of the highly viscous liquid 11 (the liquid surface facing the swelling member 17). As a result the fuel 10 can be securely let to flow out from the container body 15.

After this, the fuel 10 is sequentially supplied to the vaporizer 21 through the flow-in pipe 44 of the vaporizer 21, sequentially from those flowing out earlier from the fuel container 7. Then, the supplied fuel 10 flows from the vaporizer 21 to the vapor reforming reaction device 22, the aqueous shift reaction device 23, the selective oxidizing reaction device 24, and to the fuel cell 25 likewise the above, and an electric energy and produced water are generated or produced in the fuel cell 25. The electric energy is stored in the electricity storage unit 26 or supplied to the outside via the terminal 32. The produced water flows through the pipe 37 via the valve 36 and flows into the water introduction duct 16 of the fuel container 7 through the pipe 37 to be introduced into the room 60 of the container body 15 and absorbed by the swelling member 17. Then, as described above, the swelling member 17 swells and expands thereby making the fuel 10 stored in the container body 15 flow out from the container body 15. That is, the more furl 10 the electricity generation module 3 reforms into hydrogen, the more produced water, as a byproduct, is retained in the swelling member 17 in the room 60. Due to this, a stress works to push the fuel 10 in the container body 15 out from the fuel container 15. As a result, although the fuel 10 in the container body 15 is reduced, the fuel 10 keeps being pushed out from the container body 15.

Thereafter, the supply of the fuel 10 from the fuel container 7 to the reformer 20 (the vaporizer 21 thereof) and the introduction of the produced water from the fuel cell 25 to the fuel container 7 are repeated between the fuel storage module 2 and the electricity generation module 3.

Figure 7D:
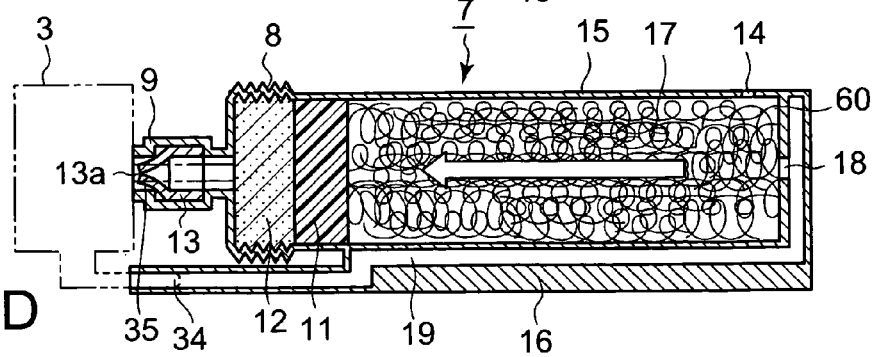

If the fuel 10 continues to flow out from the fuel container 7, there will be almost no fuel 10 left in the fuel container 7. At that time, the supply of the fuel 10 from the fuel container 7 to the reformer 20 will be ended, and the highly viscous liquid 11 will be displaced to touch the absorption member 12 and stopped at this position in the fuel container 7, as shown in FIG. 7D.

As described above, the absorption member 12 is made of an oil-repellent material and has a plurality of minute pores. Thus, the highly viscous liquid 11 is not absorbed by the absorption member 12 and does not therefore flow out from the fuel container 7 to the electricity generation module 3.

In the fuel container 7 according to the present embodiment, since the highly viscous liquid 11 is overlaid on the fuel 10 stored in the container body 15, the fuel 10 is kept in a state where it is completely sealed by the internal walls of the container body 15 and the highly viscous liquid 11. Since the absorption member 12 is filled in the portion near the draining port 9 of the container body 15, the fuel 10 is absorbed by the absorption member 12 inside the container body 15 and guided to the portion near the draining port 9.

When the produced water is introduced into the room 60 of the container body 15, this produced water is absorbed by the swelling member 17 and the air is introduced into the room 60 of the container body 15. The swelling member 17 swells by absorbing the produced water, and expands by breathing in the introduced air. Due to this, the swelling member 17 pushes the highly viscous liquid 11. As a result, the highly viscous liquid 11 is displayed by receiving the pushing force by the swell and expansion of the swelling member 17, and the fuel 10 absorbed by the absorption member 12 is let to flow out from the draining port 9. Accordingly, irrespective of how the fuel container 7 is postured, the swelling member 17 continues to swell and expand as long as the produced water is produced in the fuel cell 25, and the fuel 10 stored in the container body 15 keeps flowing out from the draining port 9 by receiving the pushing force by the swell and expansion of the swelling member 17. Therefore, the fuel container 7 of the present embodiment can let the fuel 10 stored therein flow out irrespective of how it is postured.

In the fuel container 7 of the present embodiment, since the fuel 10 stored in the container body 15 is completely sealed by the inner walls of the container body 15 and the highly viscous liquid 11 as described above, the fuel 10 is not exposed to the air. Accordingly, it is possible to prevent the fuel 10 stored in the container body 15 from being volatilized and reduced. Further, in the state where the fuel 10 is stored in the fuel container 7, air bubbles are not included (do not exist) in the interface between the fuel 10 and the highly viscous liquid 11, or in the fuel 10. Therefore, according to the electricity generation system 1 of the present embodiment, it is possible to stabilize the supply of the fuel 10 from the fuel container 7 of the fuel storage module 2 to the electricity generation module 3, and thereby to prevent a decrease in the amount of electricity to be generated by the electricity generation module 3.

Second Embodiment

A second embodiment of the present invention will now be explained with reference to the drawings. The same components as those in the first embodiment will be denoted by the same reference numerals and explanation for such components will be omitted.

Figure 8:
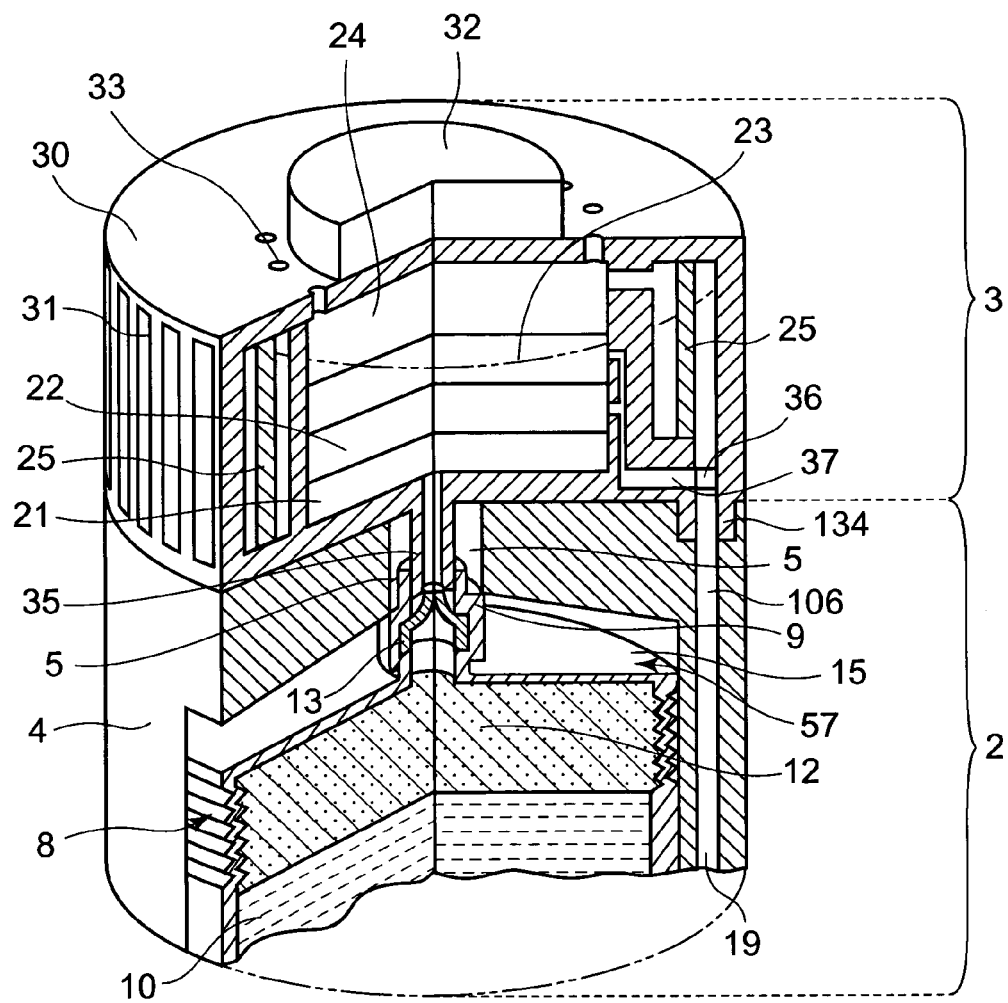
FIG. 8 is a partially cutaway perspective diagram showing schematic structures of a fuel storage module and an electricity generation module.

A fuel container 57 of the present embodiment corresponds to the fuel container 7 provided in the fuel storage module 2 of the electricity generation system 1 shown in FIG. 1. The fuel container 57 is provided in a fuel storage module 2 in an electricity generation system 1 shown in FIG. 8.

Figure 9A:
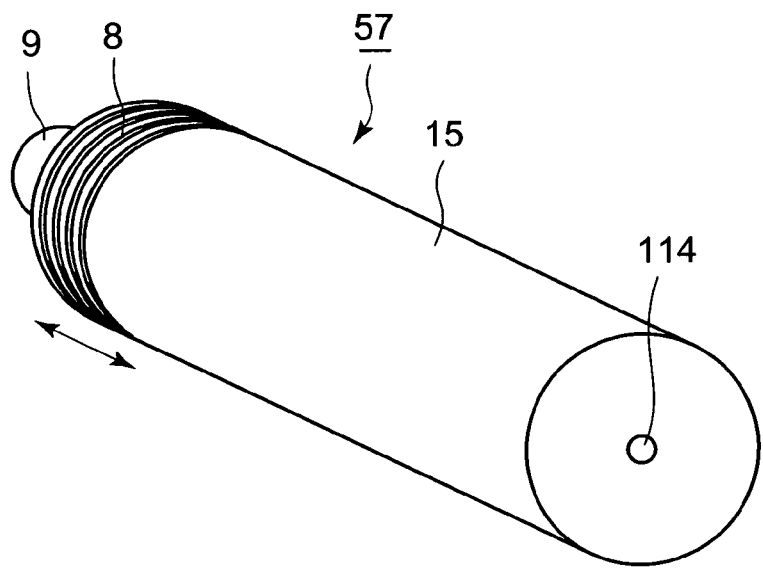
FIG. 9A is a perspective diagram showing an appearance of a fuel container.
Figure 9B:
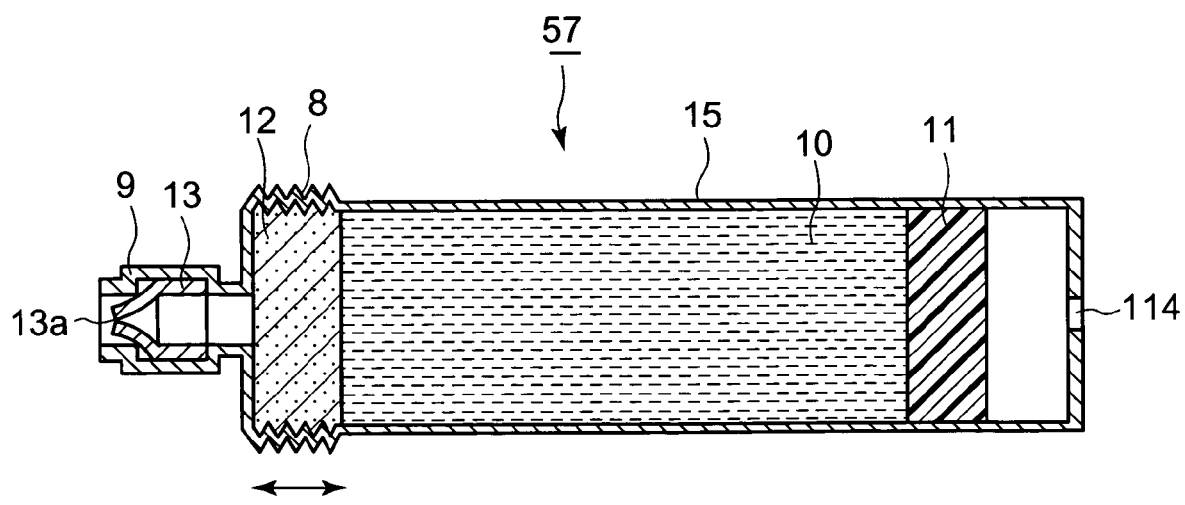
FIG. 9B is a cross sectional diagram showing an internal structure of the fuel container.

FIG. 9A is a perspective diagram showing the appearance of the fuel container 57, and FIG. 9B is a cross sectional diagram showing the internal structure of the fuel container 57.

The fuel container 57 has a cylindrical container body 15 having a predetermined length. The container body 15 is made of a transparent or semitransparent material, polyethylene, polypropylene, polycarbonate, acryl, or the like. A fluid introduction hole 114 as fluid introduction means for introducing a fluid such as the air into the fuel container 57 is formed in the bottom of the container body 15 so as to penetrate the container body 15. The fluid introduction hole 114 is a mere venthole for communicating the inside and outside of the container body 15. A draining port 9 is provided at the front end of the container body 15 so as to protrude from the container body 15. A bellows 8 as volume changing means which is extendable and shrinkable in the longitudinal direction of the fuel container 57 is formed near the draining port 9 of the container body 15. The container body 15 is increased in volume when the bellows 8 is extended, and is decreased in volume when the bellows 8 is shrunk.

As shown in FIG. 9B, a fuel 10 is stored in the container body 15. Specifically, the fuel 10 is a mixture of a chemical fuel and water. A compound including a hydrogen element, for example, alcohols such as methanol, ethanol, etc. and gasoline can be used as the chemical fuel. In the present embodiment, a mixture obtained by uniformly mixing methanol and water having the same mol percent as each other is used as the fuel 10. In the container body 15, a highly viscous liquid 11 is overlaid so as to completely cover the liquid surface of the fuel 10. Due to this, the fuel 10 is airtightly confined in the container body 15 by the inner walls of the container body 15 (except the draining port 9) and the highly viscous liquid 11. The highly viscous liquid 11 is a liquid having a higher viscosity than that of the fuel 10. Specifically, the highly viscous liquid 11 is a mineral oil such as polybutene, fluid paraffin, spindle oil, etc. or a silicon oil such as dimethylsilicon oil, methylfenylsilicon oil, etc. The highly viscous liquid 11 is colored with a coloring material, such as pigments, dyes, etc. It is preferred that the highly viscous liquid 11 be indissoluble or hardly dissoluble in the fuel 10.

The fuel 10 and the highly viscous liquid 11 are separate from each other without being mixed due to the aqueous or oleaginous characteristic thereof. The fuel 10 is stored in the container body 15 in a state where it is completely sealed by the inner walls of the container body 15 and the highly viscous liquid 11. Gaseous bodies such as the air mixed in the interface between the fuel 10 and the highly viscous liquid 11 or in the fuel 10 are previously sucked and eliminated by a vacuum degassing device or the like. Therefore, almost no (or no) air bubbles are included in the interface between the fuel 10 and the highly viscous liquid 11 or in the fuel 10.

An absorption member 12 for absorbing the fuel 10 is filled in a compressed state in a portion near the draining port 9 in the container body 15. Specifically, the absorbing member 12 is a porous oil-repellent member having a plurality of minute pores into which the highly viscous liquid 11 can not osmose and having a high absorption property toward the fuel 10 in particular. Accordingly, the highly viscous liquid 11 does not osmose into (or is not absorbed by) the absorption member 12, and does not flow out from the draining port 9 of the container body 15. The absorption member 12 airtightly contacts the inner walls of the bellows 8 formed in the container body 15. Due to this, when the bellows is shrunk and the volume of the container body 15 is reduced, the absorption member 12 is shrunk. On the contrary, when the absorption member 12 absorbs the fuel 10 and swells, the bellows 8 is extended and the volume of the container body 15 is increased.

Likewise the fuel container 7 of the first embodiment, the fuel container 57 having the above-described structure is so structured as to be detachably contained in a housing 4 of the fuel storage module 2 such that the draining port 9 is inserted to a communication hole 5. In the state where the fuel container 57 is set at a predetermined position of the fuel storage module 2, the outer circumferential surface of the container body 15 constituting the fuel container 57 is partially exposed to the outside of the housing 4. Further, as described above, the container body 15 is transparent or semitransparent, and the highly viscous liquid 11 is colored. Thus, in the state where the fuel container 57 is contained in the fuel storage module 2, the displacement of the liquid surface of the highly viscous liquid 11 can be visibly recognized via the container body 15, making it possible to easily confirm the existence of inexistence of the fuel 10 or the remaining amount of the fuel 10.

As described above, the fluid introduction hole 114 as the fluid introduction means which is formed in the container body 15 is a mere venthole. However, the fluid introduction hole 114 may be provided with a selective permeation film having a function for shutting permeation therethrough of volatile components of the fuel 10 instead of the highly viscous liquid 11, and a function for selectively permitting permeation therethrough of the air. In this case, the volatile components of the fuel 10 can be prevented from being discharged to the outside of the container body 15, the fuel 10 stored in the container body 15 can therefore be prevented from being volatilized and reduced.

Pipes 134 and 35 which protrude downwards to be fit to the fuel storage module 2 are provided at the bottom of a housing 30 of the electricity generation module 3. The pipe 134 is for draining water, and the pipe 35 is for breathing in the fuel 10 from the fuel container 57. The pipe 134 is provided with a valve 36, and a water introduction pipe 37 provided in the housing 30 communicates with the pipe 134 via the valve 36. The pipe 134 communicates with a pipe 106 of the fuel storage module 2 for serving as a communication path for transporting byproducts produced in the electricity generation module 3 to the fuel storage module 2.

A vaporizer 21 vaporizes the fuel 10 by heating the fuel 10 supplied thereto through the pipe 35 from the fuel container 57 of the fuel storage module 2. A mixed gas vaporized by the vaporizer 21 is supplied to a vapor reforming reaction device 22.

The fuel 10 stored in the fuel container 57 is prepared to flow anytime into a micropath 43 shown in FIG. 4 and FIG. 5 through the pipe 35 and a flow-in pipe 44 by a pressure applied to the inside of the container body 15.

Next, a method of using the electricity generation system 1 and the operation of the electricity generation system 1 will be explained.

Figure 10A:
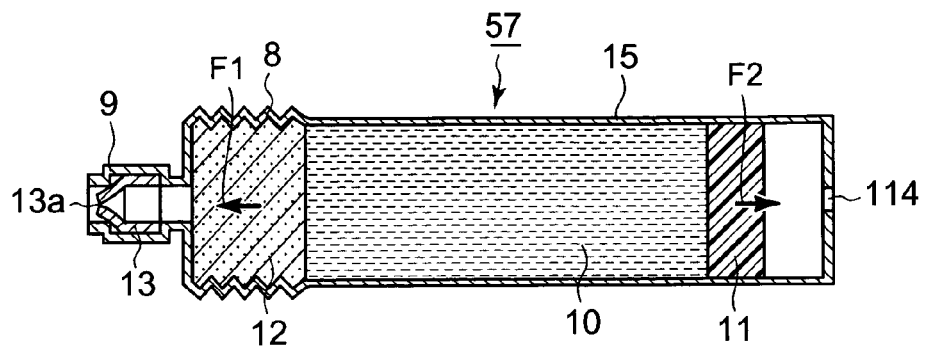
FIG. 10A to FIG. 10D are diagrams showing changes happening in the fuel container when a fuel is supplied from the fuel container to the electricity generation module.

First, the fuel container 57 storing the fuel 10 has to be set at a predetermined position of the housing 4 of the fuel storage module 2 in order for the fuel 10 to be supplied to the electricity generation module 3. As shown in FIG. 10A, in the fuel container 57 before being set, a check valve 13 is closed, and the absorption member 12 absorbs the fuel 10 and swells and thus the bellows 8 is extended. In the inside of the fuel container 57, a recovering force (absorbing force) F1 of the absorption member 12 and a surface tension F2 of the highly viscous liquid 11 work, and the recovering force F1 and the surface tension F2 are balanced.

Figure 10B:
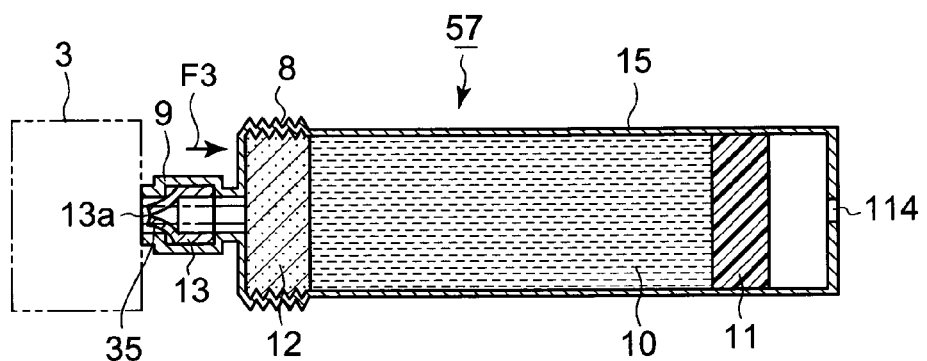

The fuel container 57 being in the state shown in FIG. 10A is set at a predetermined position of the housing 4 constituting the fuel storage module 2. After this, the fuel container 57 is pushed from the fuel storage module 2 toward the electricity generation module 3 such that the draining port 9 is inserted into the communication hole 5. Accordingly, the draining port 9 is inserted into the communication hole 5, and the pipe 35 of the electricity generation module 3 is inserted into the draining port 9 of the fuel container 57 as shown in FIG. 10B. At the same time, by the fuel container 57 being pushed toward the electricity generation module 3, the front end of the draining port 9 abuts on the bottom of the housing 30 of the electricity generation module 3 and a pushing force F3 is applied to the container body 15, making the absorption member 12 and the bellows 8 of the fuel container 57 shrink. Due to this, the fuel 10 absorbed by the absorption member 12 is discharged from the absorption member 12 by the shrinkage of the absorption member 12. At this time, since the volume of the container body 15 is reduced due to the shrinkage of the bellows 8, the pressure in the container body 15 rises and the fuel 10 concentrates to the draining port 9 as driven away. Accordingly, the pressure of the fuel 10 is applied to the check valve 13 at the draining port 9, and the check valve 13 permits the fuel 10 to flow out from the fuel container 57 through the pipe 35 to the electricity generation module 3 for a while. Due to this, the pressures inside and outside the container body 15 are balanced.

The fuel 10 that flows out fills the pipe 35 to the extent that it reaches a micropump (a micropump interveningly provided between the pipe 35 and the flow-in pipe 44 of the vaporizer 44) to serve as a stimulant to gain the lift of the micropump. That is, since there is no gas whose volume is displaced by a pressure in the pipe 35, the fuel 10 in the container body 10 can easily be acquired by the micropump. Since the check valve 13 does not allow the reverse flow of the fuel 10, no gas is mixed into the pipe 35 once the fuel container 57 is inserted to the pipe 35 of the electricity generation module 3. Therefore, stable supply of the fuel 10 is available due to the micropump.

Figure 10C:
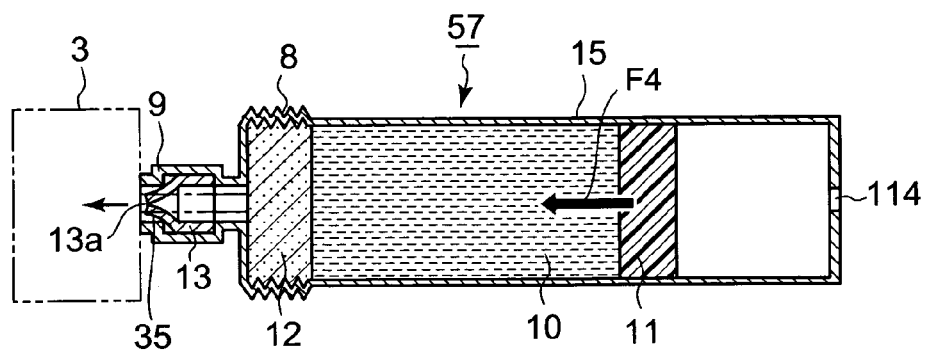

After this, the micropump of the electricity generation module 3 works under the control of a control unit 28. Thus, as shown in FIG. 10C, the fuel in the fuel container 57 is absorbed by the absorption member 12 and sucked by the micropump through the pipe 35, and an amount of the fuel 10 corresponding to a required amount of electricity generation is sequentially supplied to the electricity generation module 3. In this state, the pressure inside the container body 15 is lowered along with the reduction of the fuel 10. To keep the balance of the pressures inside and outside the container body 15, a force F4 works on the fuel 10 and the highly viscous liquid 11 such that the highly viscous liquid 11 follows the displacement of the liquid surface of the fuel 10. At this time, a negative pressure (sucking force) is produced in a space enclosed by the inner walls of the container body 15 and the liquid surface of the highly viscous liquid 11. However, since the fluid introduction hole 114 is formed in the bottom of the container body 15 constituting the fuel container 57, the external air is introduced through the fluid introduction hole 114 as much as the fuel 10 is moved (as much as the liquid surface of the fuel 10 is displaced). As a result, the negative pressure inside the fuel container 57 is adjusted.

Figure 10D:
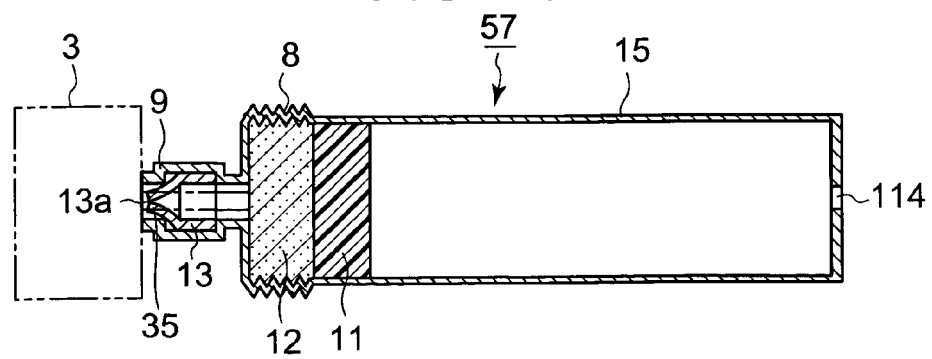

The fuel 10 in the fuel container 57 continues to flow out through the pipe 35, the supply of the fuel 10 from the fuel storage module 2 to the electricity generation module 3 is ended. Then, as shown in FIG. 10D, the highly viscous liquid 11 touches the absorption member 12 in the fuel container 57. At this time, since the absorption member is made of an oil-repellent material and has a plurality of minute pores as described above, the highly viscous liquid 11 is not absorbed by the absorption member 12 and therefore does not flow out from the fuel container 57 to the electricity generation module 3.

While the fuel 10 is supplied from the fuel storage module 2 to the electricity generation module 3 in this manner, a control signal for driving a reformer 20 is input from the control unit 28 to a distribution unit 27 in the electricity generation module 3. In response to this, electricity is supplied from the distribution unit 27 to a heat generation resistor film 47 of each of the vaporizer 21, a vapor reforming reaction device 22, an aqueous shift reaction device 23, and a selective oxidizing reaction device 24 through lead lines 48 and 49 to cause the heat generation resistor film 47 to generate heat. The control unit 28 feeds back a signal representing the voltage and current to be supplied from the distribution unit 27 to the heat generation resistor film 47 of the vaporizer 21, the vapor reforming reaction device 22, the aqueous shift reaction device 23, and the selective oxidizing reaction device 24 in order to control the voltage and current of the distribution unit 27 such that each heat generation resistor film 47 generate heat having a predetermined temperature.

As described above, in the fuel container 57 of the present embodiment, the fuel 10 stored in the container body 15 is kept in a state where it is completely sealed by the inner walls of the container body 15 and the highly viscous liquid 11, so as to be arranged to receive the recovering force (absorbing force) of the absorption member 12 inside the container body 15. When the fuel 10 is absorbed by the absorption member 12, the highly viscous liquid 11 follows the displacement of the fuel 10 and a negative pressure (sucking force) is produced in the space enclosed by the inner walls of the container body 15 and the liquid surface of the highly viscous liquid 11. Nevertheless, since the fluid introduction hole 114 is formed in the container body 15, the air is introduced through the fluid introduction hole 114 into the space in the container body 15 as much as the fuel 10 is moved (as much as the liquid surface of the fuel 10 is displaced) thereby to adjust the negative pressure in the space. Accordingly, irrespective of how the fuel container 57 is postured, that is, irrespective of in which direction the tip of the draining port 9 is oriented, the fuel 10 stored in the container body 15 is securely absorbed, almost without being left in the container body 15, by the absorption member 12 filled near the draining port 9. Accordingly, the fuel container 57 of the present embodiment can guide the fuel 10 stored therein toward the draining port 9 with almost no fuel 10 left therein, irrespective of how it is postured.

In the fuel container 57 of the present embodiment, since the fuel 10 stored in the container body 15 is completely sealed by the inner walls of the container body 15 and the highly viscous liquid 11 as described above, the fuel 10 does not contact the air. Therefore, the fuel 10 stored in the container body 15 can be prevented from being educed by volatilization. Further, in the state where the fuel 10 is stored in the fuel container 57, air bubbles are not included (do not exist) in the interface between the fuel 10 and the highly viscous liquid 11 or in the fuel 10. Therefore, according to the electricity generation system 1 of the present embodiment, the fuel 10 can stably be supplied from the fuel container 57 of the fuel storage module 2 to the electricity generation module 3, and a decrease in the amount of electricity to be generated by the electricity generation module 3 can therefore be prevented.

The present invention is not limited to the above-described embodiments, but various improvements and modifications of the design are available within the scope of the meaning of the present invention.

Figure 11:
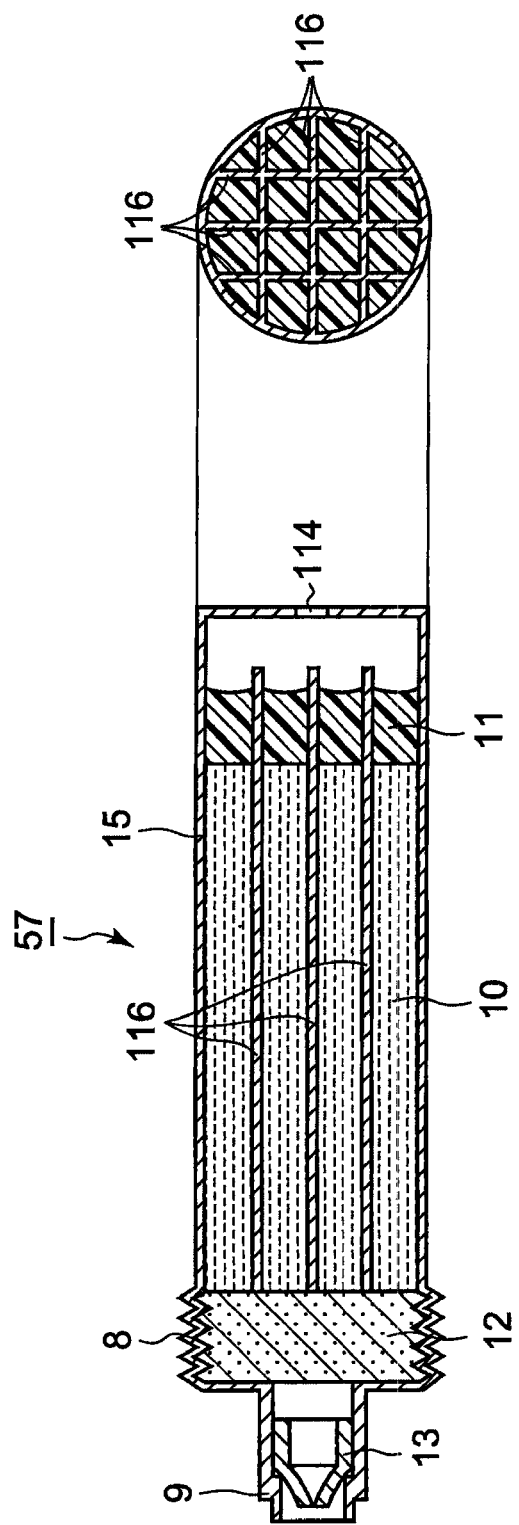
FIG. 11 is a cross sectional diagram showing a modified example of the fuel container shown in FIG. 9B.

For example, as shown in FIG. 11, the container body 15 of the fuel container 57 may be internally segmented by a plurality of partitioning plates 116, 116, . . . which are arranged in parallel with the longitudinal direction of the fuel container 57 (in the direction in which the fuel 10 or the highly viscous liquid 11 is displaced). In this case, the highly viscous liquid 11 contacts not only the inner walls of the container body 15 but also the partitioning plates 116. The viscosity of the highly viscous liquid 111 works on the inner walls of the container body 15 and the partitioning plates 116, making it harder for the highly viscous liquid 11 to be displaced in the container body 15. Therefore, even if the fuel container 57 falls and is given a shock, it is possible to maintain the state where the fuel 10 is completely sealed by the inner walls of the container body 15 and the highly viscous liquid 11, and to prevent any air bubbles from being included in the interface between the fuel 10 and the highly viscous liquid 11 or in the fuel 10 due to the fuel 10 moving in the container body 15. Further, it is possible to promote the capillary attraction phenomenon by the surface tension, by narrowing the interval between the partitioning plates 16. This makes it possible to supply the fuel 10 to the electricity generation module 3 faster.

In the above described embodiments, the check valve 13 is provided to the fuel container 57. However, the present invention is not limited to this, but the check valve 13 may be provided to the electricity generation module 3. In this case, the check valve 13 may be set at any place as long as it is between the micropump and the tip of the pipe 35.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-74891 filed on Mar. 19, 2003 and Japanese Patent Application No. 2003-74900 filed on Mar. 19, 2003 and including specification, claims, drawings and summary. The disclosure of the above Japanese Patent Applications is incorporated herein by reference in its entirety.

INDUSTRIAL APPLICABILITY

The present invention can be applied to an industrial field in which a fuel container for storing a liquid fuel is used.

The invention claimed is:

1. A fuel container comprising:
   a container body for storing a fuel;
   a draining port provided to said container body for supplying said fuel to outside of said container body;
   a fluid introduction unit which introduces a fluid into said container body, wherein the fluid is produced from said fuel that flows out from said draining port; and
   a swelling member which communicates with said fluid introduction unit, and swells in said container body by absorbing the fluid.

2. The fuel container according to claim 1, further comprising a highly viscous liquid which is interveningly provided between said fuel and said swelling member in said container body.

3. The fuel container according to claim 1, further comprising an absorption member which can absorb said fuel and which is filled in said container body.

4. The fuel container according to claim 1, further comprising a volume changing unit which changes a volume of said container body and which is provided in said container body.

5. The fuel container according to claim 4, further comprising an absorption member which can absorb said fuel and which is filled in said container body; and
   wherein said absorption member shrinks in response to a decrease in the volume of said container body due to said volume changing unit.

6. The fuel container according to claim 4, wherein said volume changing unit comprises a bellows which is shrinkable and extendable in response to a stress.

7. The fuel container according to claim 1, further comprising an external air introduction unit for introducing external air into said container body.

8. The fuel container according to claim 7, wherein said external air introduction unit comprises a venthole which communicates inside and outside of said container body.

9. The fuel container according to claim 8, further comprising a selective permeation film which is provided in the venthole, and which shuts off permeation of volatile components of said fuel and selectively permits permeation of external air.

10. The fuel container according to claim 1, further comprising a check valve which is provided inside said draining port, and which permits flow-out of said fuel from said container body to outside of said draining port and prevents flow-in of said fuel from the outside of said draining port into said container body.

11. The fuel container according to claim 1, wherein said fluid introduction unit comprises a path which connects to said swelling member and through which the fluid can flow.

12. The fuel container according to claim 1, wherein said swelling member comprises a compressed body which is obtained by compressing at least one of pulp, fiber, and textile, by adding thereto a water-soluble adhesive agent.

* * * * *